May 26, 1970 M. M. BECKA ET AL 3,513,495
APPARATUS FOR TEMPORARILY ATTACHING AN INSOLE TO A LAST
Filed Oct. 19, 1967 11 Sheets-Sheet 1

INVENTORS
Michael M. Becka
BY Allen C. Harriman

Arthur J. Bookstein ATT'Y

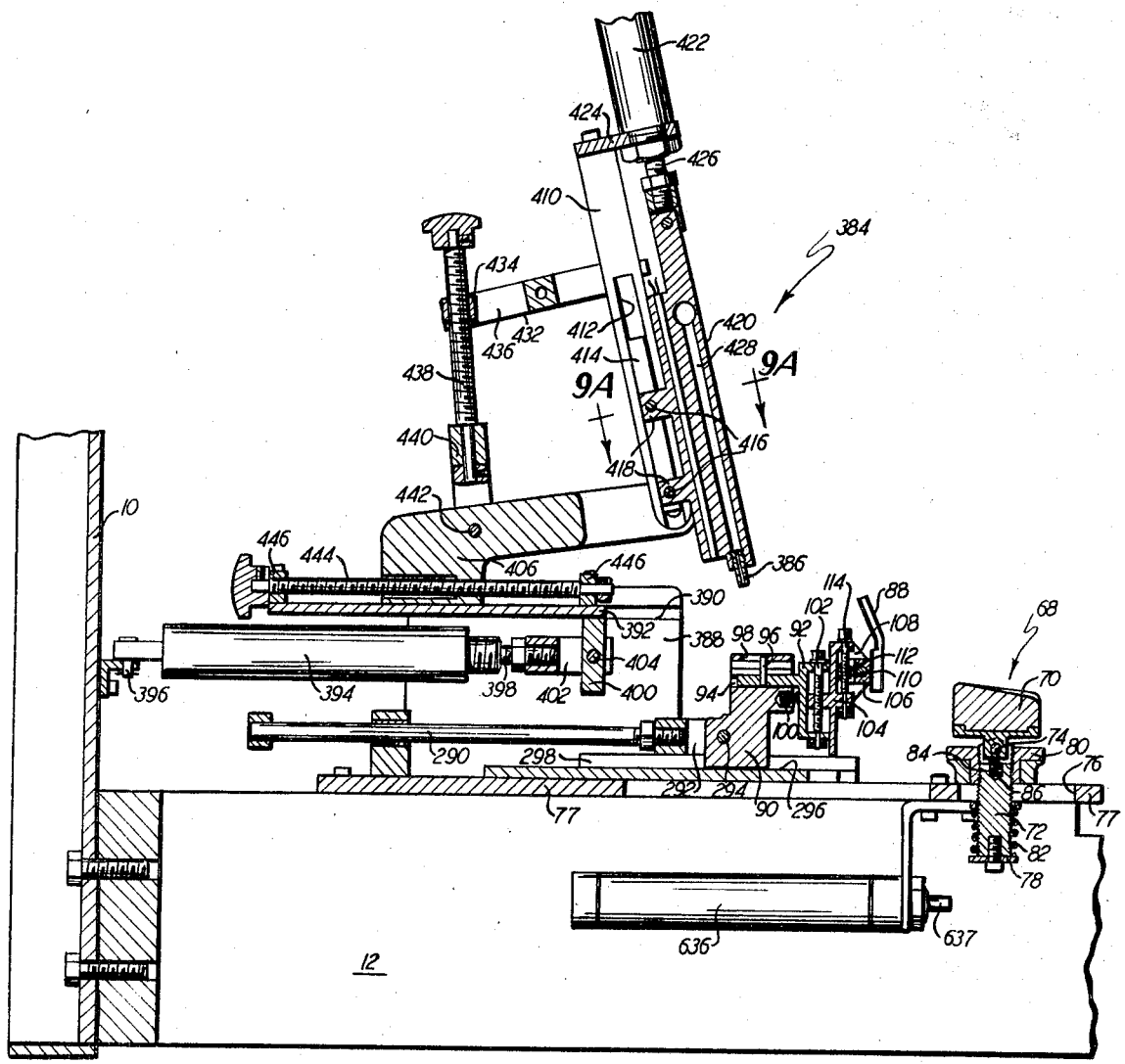
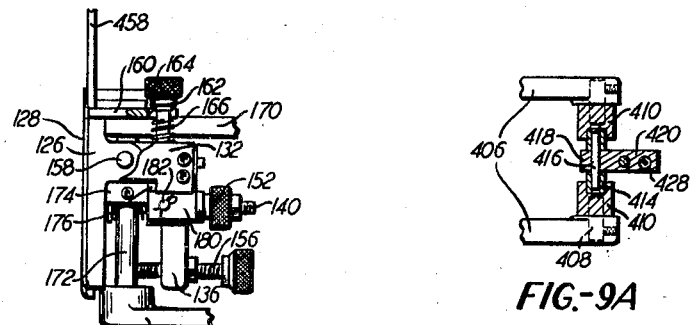
FIG.-7
FIG.-8
FIG.-9A

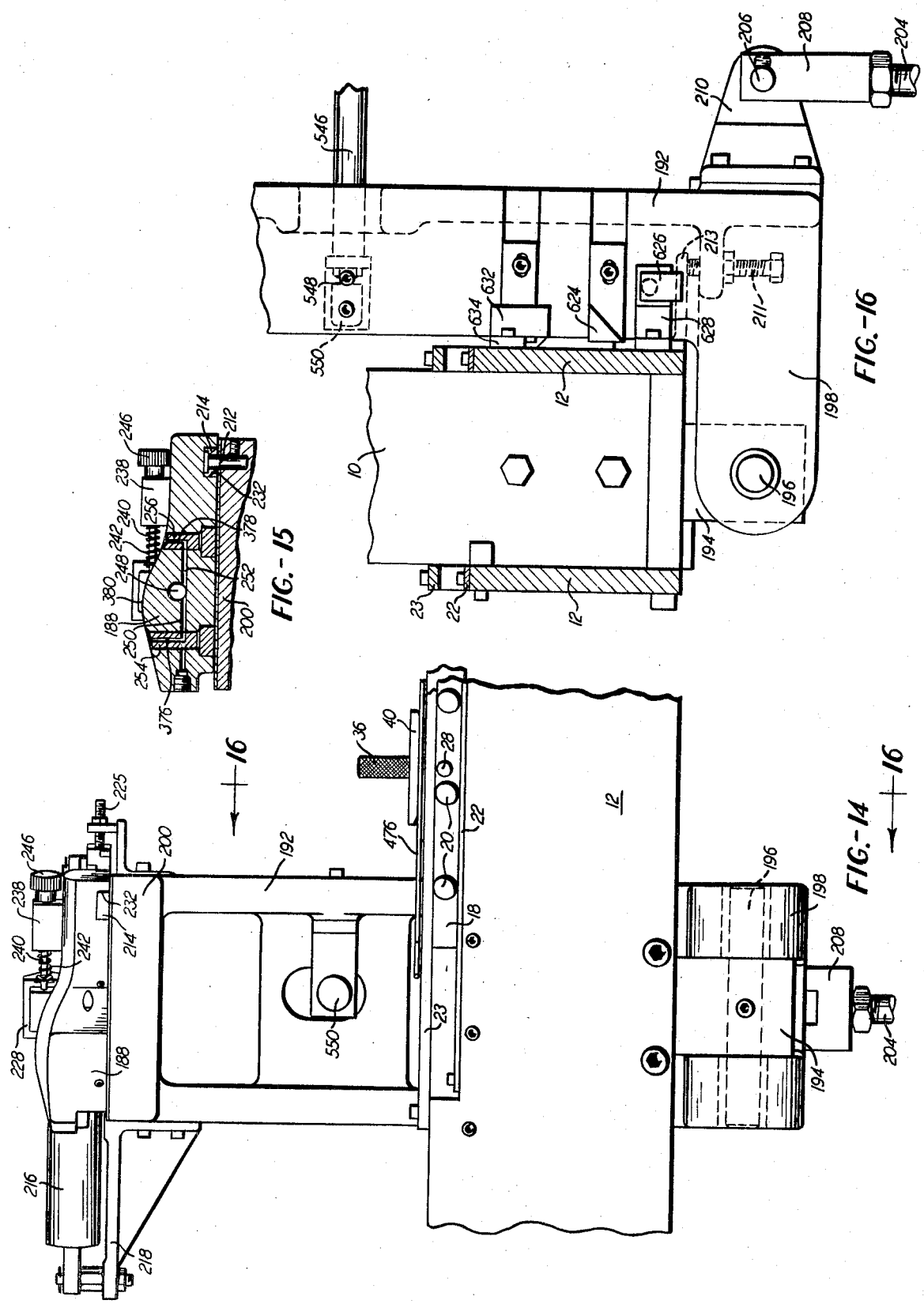

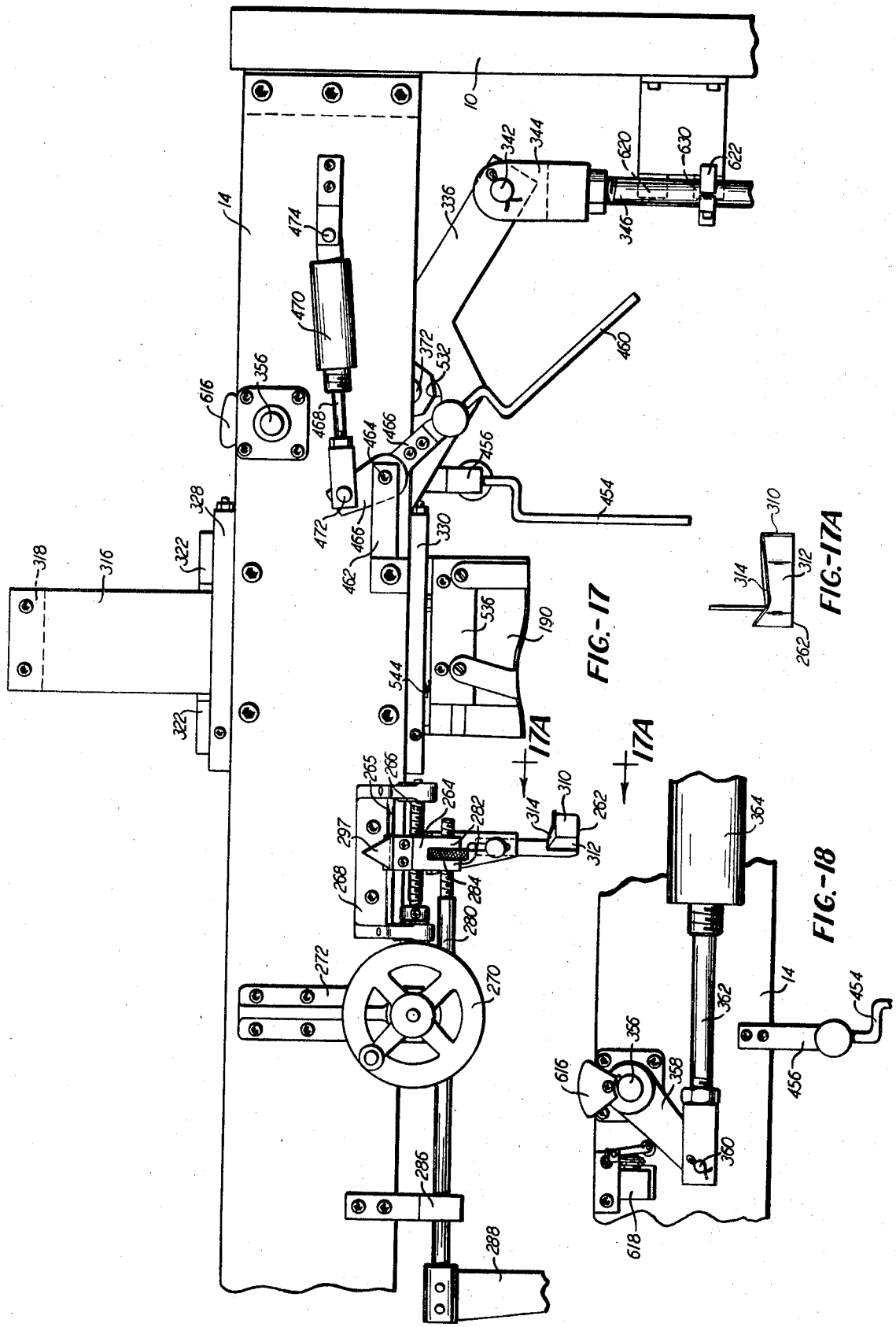

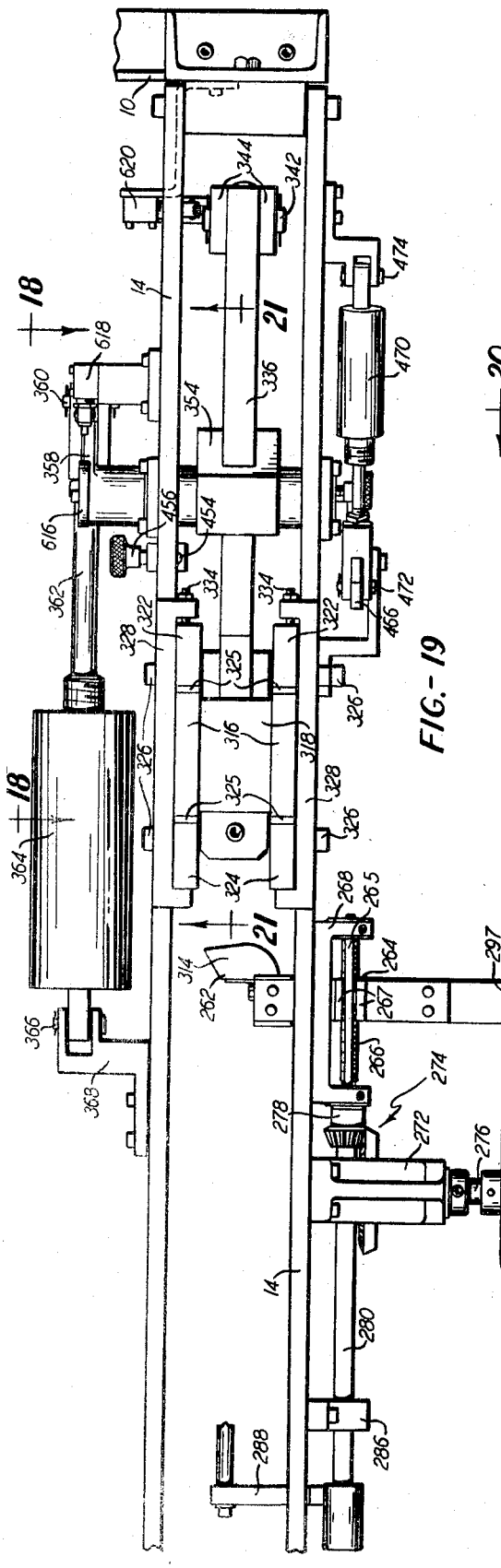
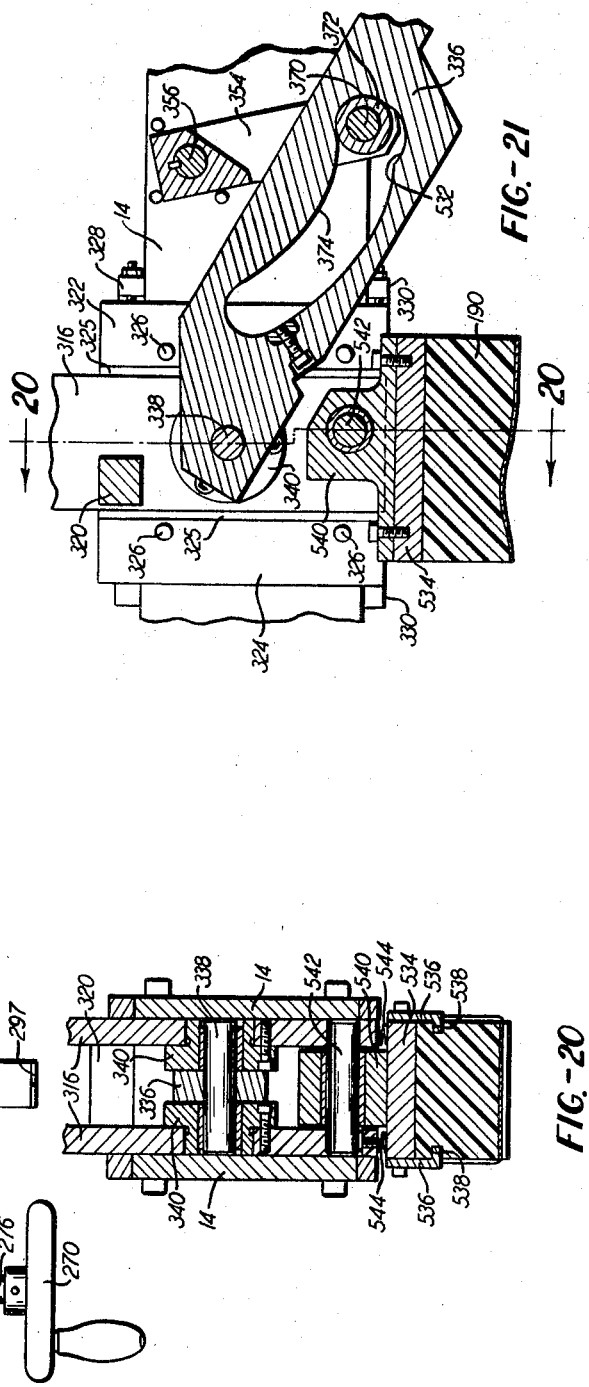
FIG.-19
FIG.-21
FIG.-20

May 26, 1970 M. M. BECKA ET AL 3,513,495
APPARATUS FOR TEMPORARILY ATTACHING AN INSOLE TO A LAST
Filed Oct. 19, 1967 11 Sheets-Sheet 11
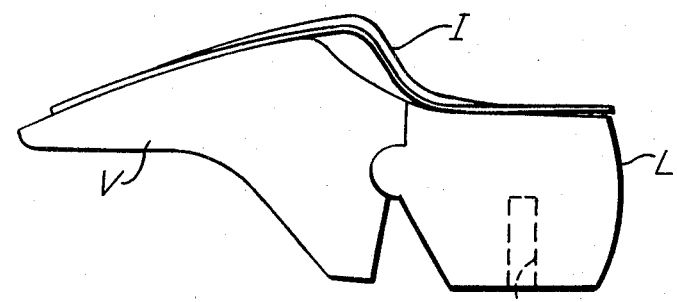
FIG.-25
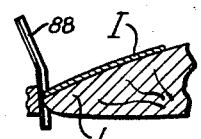
FIG.-26
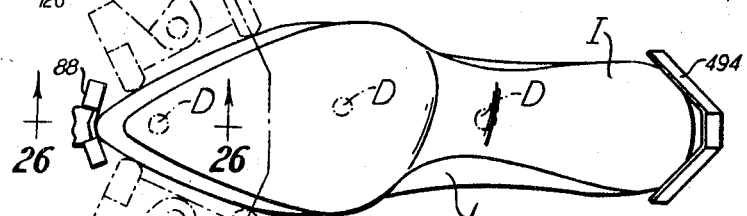
FIG.-27
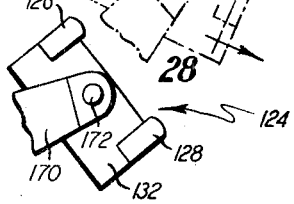
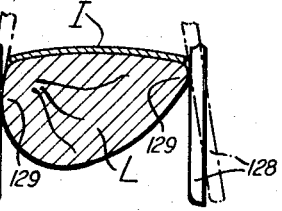
FIG.-28
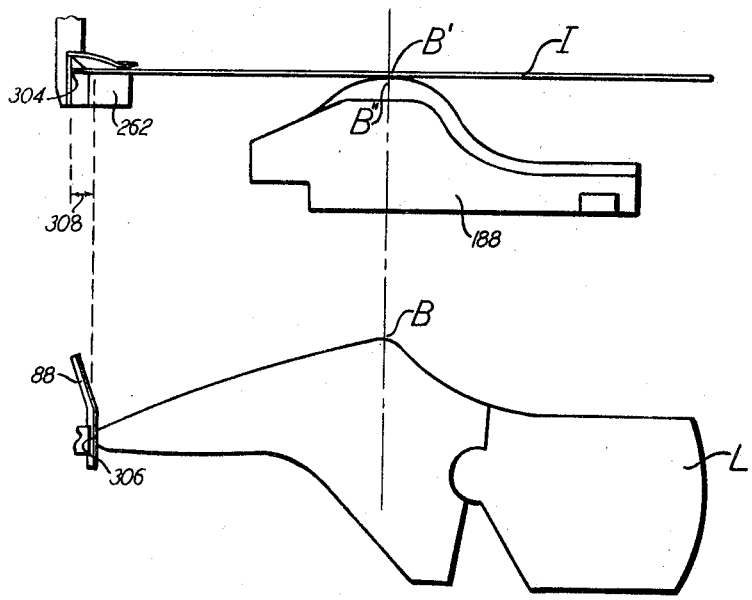
FIG.-29
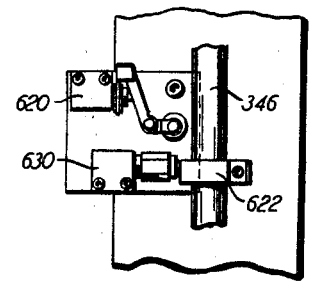
FIG.-31

United States Patent Office 3,513,495
Patented May 26, 1970

---

3,513,495
APPARATUS FOR TEMPORARILY ATTACHING AN INSOLE TO A LAST
Michael M. Becka, Watertown, and Allen C. Harriman, Brockton, Mass., assignors to Jacob S. Kamborian, West Newton, Mass.
Filed Oct. 19, 1967, Ser. No. 676,581
Int. Cl. A43d
U.S. Cl. 12—1                                                   18 Claims

ABSTRACT OF THE DISCLOSURE

The disclosure is concerned with apparatus for locating a molded insole on a last bottom and then temporarily and adhesively attaching the insole to the last bottom. The apparatus includes a molding device that is adapted to overmold the insole to an exaggerated contour so as to disrupt its fiber continuity thus rendering it less elastic. Locating devices serve to locate the insole in registry on the last bottom and a pressing device then presses the insole into flush adhesion against the last bottom, an adhesive applying device having been operative earlier to cause adhesive to be applied to the facing surfaces of the last and insole. A portion of the adhesive applying device serves a dual purpose in that it also presses the insole to the bottom of the last.

Background of the invention

The instant invention pertains to the shoe manufacturing art and more particularly to an apparatus for molding an insole to the contour of the bottom of a last and adhesively temporarily securing the insole to the last bottom so that the insole may remain in place during subsequent shoe manufacturing operations but may be easily detached from the last after the shoe manufacturing operations have been completed. It is an improvement over the subject matter and invention disclosed in U.S. application Ser. No. 610,097, filed Jan. 18, 1967, now Pat. No. 3,439,367.

Summary of the invention

One aspect of the instant invention is concerned with a combined adhesive applicator and pressing member which is movable from a remote position to a position adjacent the bottom of the last whereupon adhesive may be applied thereby to the bottom of the last. After the adhesive is so deposited the applicator is returned to its remote position and an insole is placed on the last bottom whereupon the applicator is returned to its working position and is urged towards the bottom of the last to effect a pressing of the insole to the last, there being no dispensing of adhesive from the applicator during this pressing operation.

Another object of the instant invention is to provide a gaging device that facilitates the alignment of the ball portions of the last, the insole to be attached thereto and a mold member incorporated into the machine. The alignment of these various ball portions are effected by means of edge gages that contact the edge of the insole and last.

A further aspect of the instant invention is concerned with a combined unit for gripping the forepart of the last and aiding in locating the insole in registry on the bottom thereof. To this end a pair of gage bars are provided that embrace but are normally spaced from the forepart of the last and are urged inwardly towards the last to engage the bulging regions thereof and thus grip the last. When the gage bars so grip the last they extend upwardly of the last and do not contact the periphery of the bottom forepart of the last. After the insole has been placed on the bottom of the last the gage bars are then caused to be inclined inwardly so that they do contact the periphery of the last bottom in the forepart region thereof and thus serve as guides in locating the insole in registry on the bottom of the last.

A further object of the instant invention is to provide a movable support for a last which includes means for locking the last to the support and means responsive to the locking of the last to the support to in turn lock the support itself in place in the machine and preclude it from further movement.

The invention will now be described in detail with reference to the accompanying drawings wherein:

FIG. 1 is a front elevation of the machine;
FIG. 2 is a plan view of the last support;
FIG. 3 is a side elevation of the last support and locking device therefor with portions of the lower sub-frame removed for greater clarity;
FIG. 4 is a view of the last support taken along the line 4—4 of FIG. 2;
FIG. 5 is a plan view of the mold member and its mounting to the mold support;
FIG. 6 is a sectional view of the mold member taken along the line 6—6 of FIG. 5;
FIG. 7 is a sectional view of the toe bonding unit, toe support and toe gage;
FIG. 8 is an elevation of a forepart gage taken along the line 8—8 of FIG. 11;
FIG. 9 is a front elevation of the toe bonding unit, toe support and last toe gage;
FIG. 9A is a sectional view of the toe bonding unit taken along the line 9A—9A of FIG. 7;
FIG. 10 is a partly broken away view of a forepart gage taken along the line 10—10 of FIG. 12;
FIG. 11 is a view of a forepart gage taken along the line 11—11 of FIG. 10;
FIG. 12 is a plan view of the forepart gages and last toe gage;
FIG. 13 is a front elevation of the forepart gage unit;
FIG. 14 is a front elevation of the mold support and mold member mounted thereto;
FIG. 15 is a sectional view of the mold member taken along the line 15—15 of FIG. 5;
FIG. 16 is a toeward view of the mold support taken along the line 16—16 of FIG. 14;
FIG. 17 is a front elevation of the pressing unit and insole toe gage;
FIG. 17A is an elevation of the insole toe gage taken along the line 17A—17A of FIG. 17;
FIG. 18 is an elevation of the rear of the upper sub-frame taken along the line 18—18 of FIG. 19;
FIG. 19 is a plan view of the upper sub-frame and members supported thereon;
FIG. 20 is a sectional view of the rams and pressing pad taken along the line 20—20 of FIG. 21;
FIG. 21 is a sectional view of the movable fulcrum and lever arm when the machine is in idle position;
FIG. 22 is an illustration of a relatively flat last and the insole therefor and illustrating the absence of any overhang of the toe of the insole with respect to the toe of the last;
FIG. 23 is a view similar to that of FIG. 21 and illustrating the position of the fulcrum and lever arm when the fulcrum has been urged to its most toeward position in readiness for the overmolding operations;
FIG. 24 is an illustration similar to that of FIG. 23 and illustrating the fulcrum pin in its most heelward position and the position of the lever and pressing pad during the pressing of the insole to the bottom of the last;
FIG. 25 is a side elevation of a last having an overmolded insole located in general registry on the bottom thereof;

FIG. 26 is a sectional view of the last toe gage and illustrating its utility in gaging the distance between the toe end of the insole and the toe end of the last;

FIG. 27 is a plan view of a last having an overmolded insole located in general registry on the bottom thereof and illustrating the positions of the heel gage, forepart gages in their movement from a remote position to a working position and the last toe gage;

FIG. 28 is a substantially schematic illustration taken along the line 28—28 of FIG. 27 and illustrating the position of the tilting gage bars from an upright position to an inclined position wherein the gage bars contact the periphery of the bottom forepart of the last;

FIG. 29 is an illustration of the relatively high heeled last and the overhang that is associated with the insole for the last when the ball portion of the insole is located in alignment with the ball portion of the last;

FIG. 31 is a view of a valving arrangement taken along the line 31—31 of FIG. 1.

In the following description the operator will be considered as being located at the front of the machine (see FIG. 1) and directions that are towards and away from the operator will be referred to as being forward and rearward respectively. Directions that extend to the operator's left will be referred to as toeward and directions extending towards his right will be referred to as heelward. The term "general registry" will hereinafter refer to a condition wherein two members having substantially similar projected shapes such as a last bottom and an insole are disposed in the same general direction; eg: the toe of the insole points in the same general direction as the toe of the last, but the insole periphery does not coincide with a projection of the last bottom. The term "final registry" as used herein will refer to a condition wherein the insole and last are more closely disposed in a common direction and the periphery of the insole is as coincident with a projection of the last bottom as is practically possible.

Figure 1:
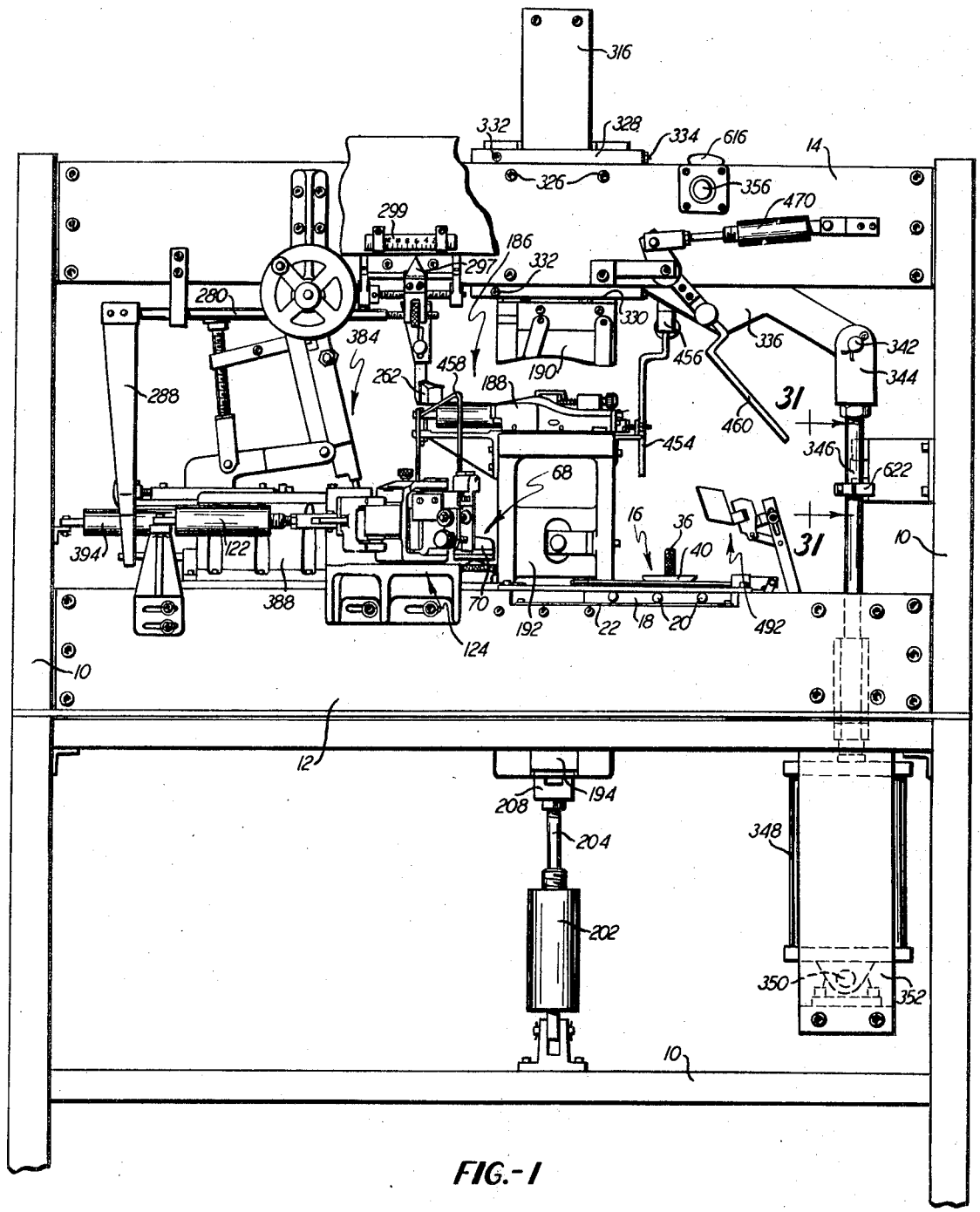
Figure 2:
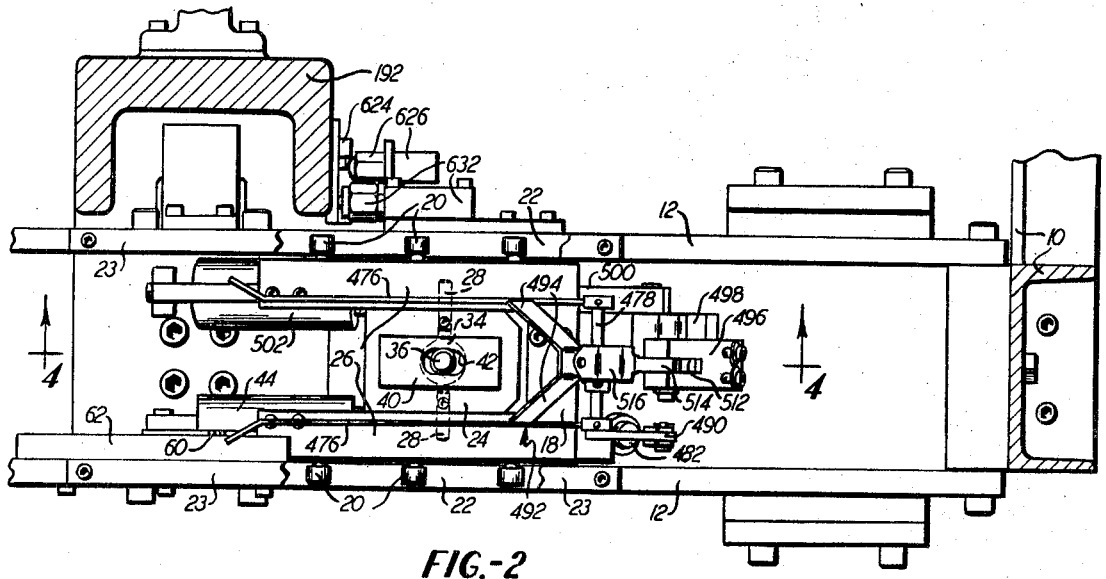
Figure 3:
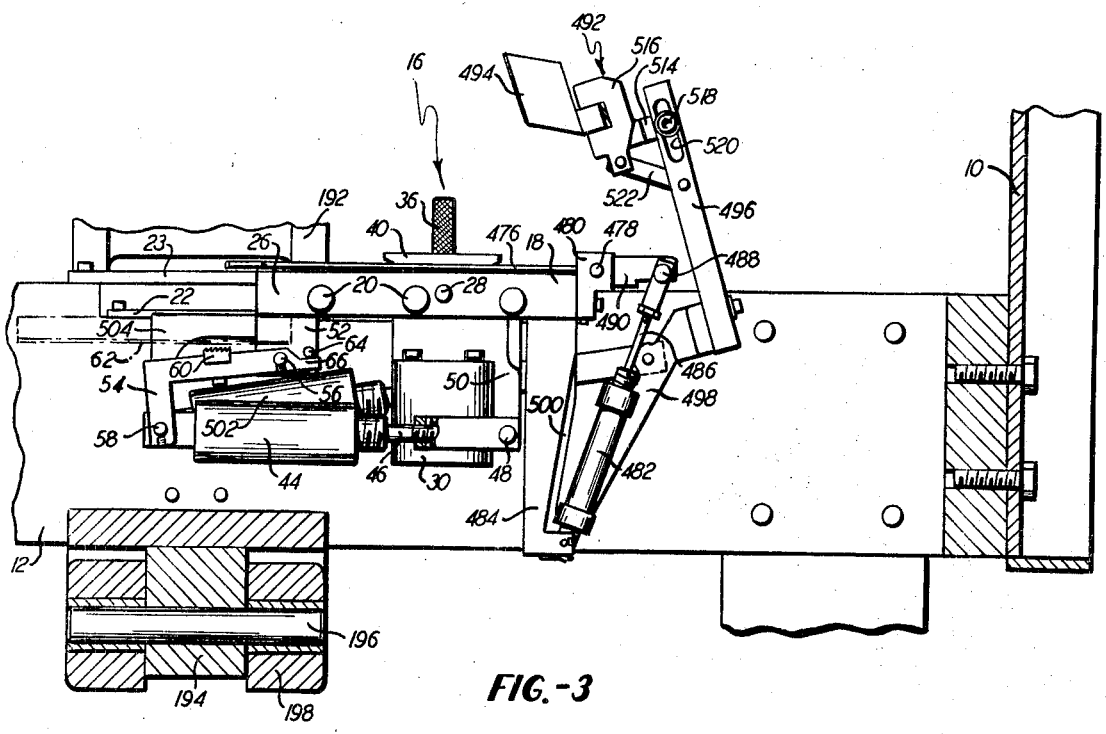
Figure 4:
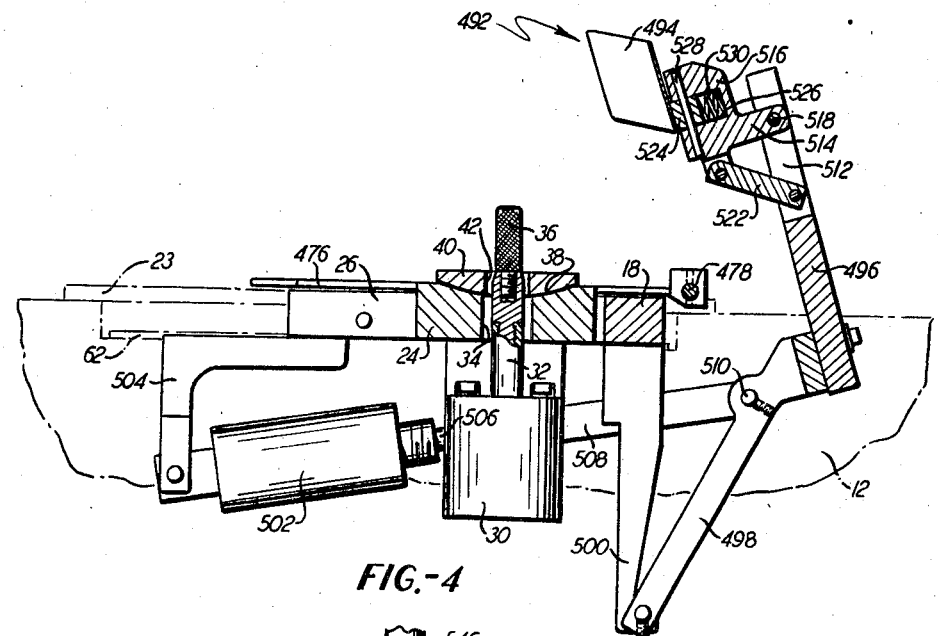

Referring to FIG. 1 the machine includes a frame 10 having a lower sub-frame 12 and an upper sub-frame 14. A last support 16, adapted to support the heel end of a last L in a bottom-up position, is supported on the lower sub-frame 12. Referring to FIGS. 2, 3 and 4 the last support 16 includes a U-shaped carriage 18 that is movable on the lower sub-frame 12 in a heelward-toeward direction by means of rollers 20 that are rotatably mounted to the carriage 18 for movement along tracks 22 formed in the lower sub-frame 12. Cover plates 23, secured to the lower sub-frame 12 retain the rollers 20 in the tracks 23. A pivot block 24 is pivotally mounted between the legs 26 of the carriage 18 by means of the pins 28. An air operated motor 30 is secured to the underside of the pivot block 24 and has a piston rod 32 extending upwardly through a hole 34 formed in the pivot block 24. A last pin 36 is secured to the upwardly extending end of the piston rod 32. An arcuate slot 38 formed in the upper surface of the pivot block 24 accommodates a last plate 40 having a curved bottom surface complementary to the surface of the slot 38 to thus enable the last plate 40 to rock within the slot 38 in a heelward-toeward direction. A hole 42 is formed in the last plate 40 to enable the last pin 36 to protrude upwardly therethrough. The hole 42 in the last plate 40 is of greater size than the diameter of the last pin 36 to insure that the plate 40 may rock in the slot 38 without interference from the last pin 36. Thus the pivot block 24, motor 30 and last pin 36 may have movement that is in unison with the carriage 18 as well as pivoting movement with respect to the carriage 18 about the pins 28. The pivoting of the pivot block 24 is effected by means of an air operated motor 44 that is suspended from the carriage 18, the piston rod 46 of the motor 44 being pivotally connected at the pin 48 to a bracket 50 that is secured to the pivot block 24. The motor 44 is suspended from a depending portion 52 of the carriage 18 by means of an L-shaped arm 54 that is pivotally connected thereto by means of the pin 56 and to the motor 44 by means of the pin 58. It may be seen from FIG. 3 that as the motor 44 is actuated to cause the piston rod 46 to move to the right thus causing toeward pivoting of the last pin 36 about the pins 28 (counter-clockwise as seen in FIG. 3) the other end of the motor 44 will be urged toewardly (to the left in FIG. 3) thus causing the arm 54 to swing upwardly in a clockwise direction about the pin 56. The arm 54 has a toothed midportion 60 that is disposed below a rack 62 that is secured to the lower sub-frame 12. As the arm 54 swings clockwise, the toothed portion 60 moves upwardly into engagement with the rack 62 thus locking the arm 54 and carriage 18 in place. When the motor 44 has been fully actuated the carriage 18 is so locked and the last pin 36 has been pivoted in a toeward direction for a purpose later described. The downward movement of the arm 54 is limited by means of a pin 64 that is secured to the depending portion 52 of the carriage 18 and is engageable with the other end 66 of the arm 54.

Figure 9:
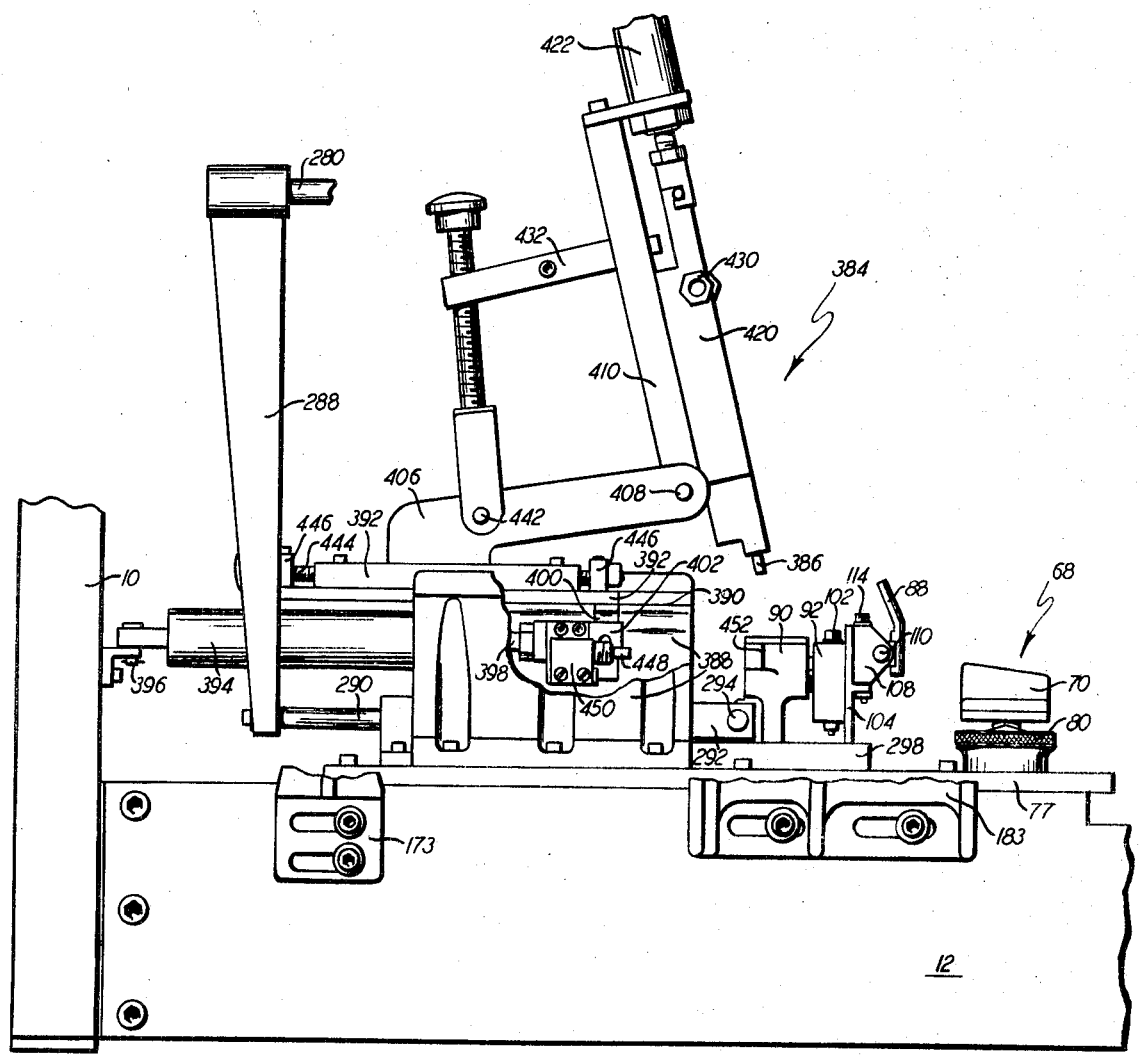

Referring to FIGS. 1, 7 and 9 it may be seen that a toe rest 68 that is adapted to support the toe end of the last L is mounted to the lower sub-frame 12 toewardly of the last support 16. The toe rest 68 includes a toe block 70 that is pivotally mounted to the upper end of a threaded column 72 at the pin 74. The other end of the column 72 extends downwardly through a slot 76 formed in a top plate 77 that is mounted on the lower subframe 12, there being a flange 78 secured to the bottom end of the column 72. A nut 80 is disposed on the lower sub-frame 12, is threadably engaged with the column 72 and serves to enable heightwise adjustment of the column 72 and toe block 70 supported thereon. A compression spring 82 encircles the lower portion of the column 72 and is compressed between the flange 78 and the bottom of the top plate 77. The toe block 70 is biased in the position illustrated in FIG. 7 by means of a compression spring 84 that is contained within a bore 86 formed in the upper end of the column 72, the other end of the spring 84 being in engagement with the toe block 70. When presenting a last L to the machine it is inserted in a bottom-up position with the heel end thereof being placed on the last plate 40 in such a manner that the last pin 36 enters the thimble T of the last L. At the same time the vamp V of the last L is placed upon the toe block 70. The last L is then urged toewardly, the carriage being drawn toewardly therewith, with the vamp portion V of the last L resting on the upper surface of the toe block 70. With the last pin 36 in engagement with the thimble T of the last L, actuation of the motor 44 forces the last L in a downward and toe-ward direction to cause the vamp of the last to forcefully bear against the toe block 70 thus locking the last in place. The last plate 40 may rock, in response to movement of last, within the slot 38 to maintain its flush engagement with the last.

Figure 12:
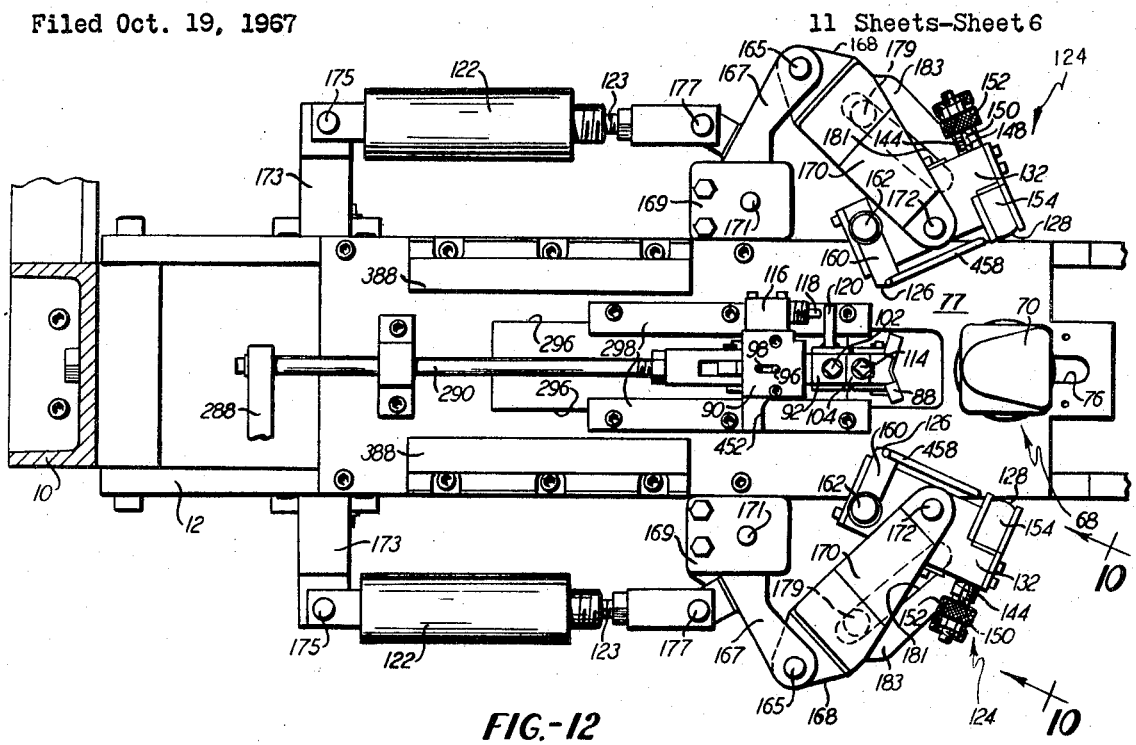
Figure 13:
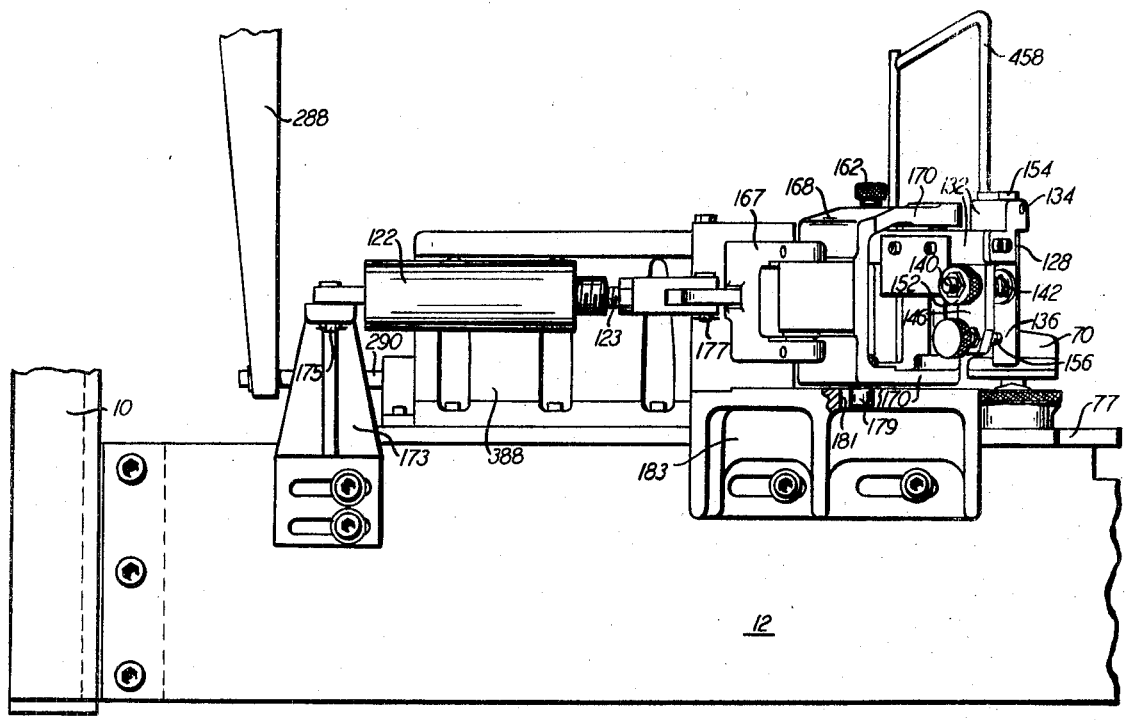

Referring to FIGS. 7, 9 and 12 a last toe gage 88 is located on the lower sub-frame 12 of the machine toe-wardly of the rest 68 and at an elevation such that it may be abutted by the toe end of the last L when the last is urged in a toeward direction. The gage 88 is movable in a heelward-toeward direction and is biased heel-wardly so that upon engagement by the last L, the toe gage 88 may be yieldably urged in a toeward direction for a purpose described below. The mounting of the toe gage 88 includes a gage support 90 and a bracket 92 that is slidably mounted in a guideway 94 formed in the gage support 90 for movement in a heelward-toeward direction. The extent of heelward-toeward movement of the bracket 92 is limited by means of a pin 96 that is secured to the bracket 92 and extends upwardly into a slot 98 formed in the toe support 90. A compression spring 100 interposed between the gage support 90 and the bracket 92 serves to bias the bracket 92 and the toe gage 88 heelwardly. The position of the toe gage 88 is adjustable with respect to the bracket 92 in both heightwise and tilting directions. The heightwise adjustment of the toe gage 88 is effected by means of a vertically disposed screw 102 that is rotatably mounted to the bracket 92. A heightwise movable bracket 104 is threadably engaged with the screw 102 so that rotation of the screw 102 may impart heightwise movement to the bracket 104 by which the toe gage 88 is supported. The toe gage 88 is secured to a lever 106 which in turn is pivotally mounted to a heelwardly extending clevis portion 108 of the bracket 104 by means of the pin 110. A nut 112 is pivotally mounted to the toeward end of the lever 106 and is in threaded engagement with a heightwise extending screw 114 that is in turn rotatably supported within the bracket 104. It may thus be seen that rotation of the screw 114 will cause the lever 106 and toe gage 88 secured thereto to pivot about the pin 110 in a heelward-toeward direction and rotation of the screw 102 will effect heightwise movement of the bracket 104 and toe gage 88 carried thereon. Referring to FIG. 12 a valve 116 is mounted to the gage support 90 and has a heelwardly extending plunger 118 that is in alignment with an extension 120 of the bracket 92 so that as the toe gage 88 and bracket 92 are urged toewardly in response to toeward movement of the last L, the extension 120 may depress the plunger 118 and thus trigger the valve 116. The valve 116 is interposed in the control circuit of the machine as to effect actuation of the motor 44 to lock the carriage 18 in place and to cause the last pin 36 to pivot in a toeward direction thus locking the last rigidly in place in the machine. The tilting adjustment of the toe gage 88 is of importance in subsequent operations of the machine and in particular when the overmolded insole is located on the bottom of the last. In the manufacture of various styles of shoes it is sometimes desirable to space the toe tip of the insole slightly from the toe tip of the last. As may be seen from FIG. 26 the toe gage 88 may be tilted to positions such that when it is in abutment with the toe tip of the last the insole tip may be in registry with or displaced from the last toe tip, depending on the inclination of the gage 88.

Figure 10:
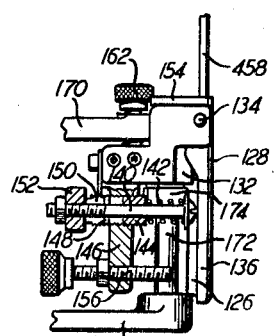

The shifting of the valve 116 also causes motors 122 to be actuated to cause forepart gages 124 to move inwardly towards the forepart of the last L. Referring to FIGS. 8, 10, 11, 12 and 13 each of the forepart gages 124 includes a pair of gage bars 126 and 128 that normally extend in a heightwise direction. As the forepart gages 124 are moved inwardly towards the last L the gage bars 126 and 128 are brought to bear against the periphery of the forepart of the last. It should be noted that due to the shape of the last in the forepart region the gage bars 126 and 128 will not contact the exact periphery of the bottom of the last L but will engage the laterally bulging portions 129 of the last indicated in FIG. 28. The construction of each forepart gage 124 is such that each gage bar 128 may be caused to pivot to the position illustrated in phantom in FIG. 28 wherein the gage bar 128 is in engagement with the exact periphery of the bottom of the last L for a purpose later described. Referring to FIGS. 10, 11, 12, 13 and 27, the construction of each of the forepart gages 124 includes a frame 132 having the forepart gage bar 126 disposed at the toeward end thereof and the forepart gage bar 128 located at the heelward end thereof. The upper end of the heelward forepart gage 128 is pivoted to the frame 132 by means of the pin 134 to enable the lower depending portion 136 of the forepart gage 126 to swing laterally towards and away from the last L thus enabling the gage bar to be disposed in an inclined attitude. The gage bar 128 is biased in a normally upright, uninclined position by means of a bolt 140 which is yieldably urged inwardly against the gage bar 128 by means of a compression spring 142 that encircles the bolt 140. The bolt 140 is slidably contained within a bushing 144 that is threaded into a depending portion 146 of the frame 132. A pin 148 is secured to the bolt 140 and extends into a slot 150 found in the bushing 144 so that the bolt may be rotated in unison with the bushing 144. A knurled knob 152, formed integrally with the other end of the bushing 144, serves to facilitate rotation of the bushing 144. An arm 154, is formed at the upper end of the gage bar 128 and bears against the top of the frame 132 when the gage bar 128 is in a vertical, uninclined disposition thus precluding outward pivoting (counterclockwise as seen in FIG. 10) of the gage bar 128 beyond the vertical. Thus in order to effect inward pivoting of the gage bar 128 about the pin 134 the resistance of the compression spring 142 must be overcome. The extent to which the gage bar 128 may pivot is limited by means of a stop screw 156 that is threaded into the depending portion 146 of the frame 132 and is in alignment with the lower end 136 of the gage bar 128. The more toeward gage bar 126 is similarly pivoted to the frame 132 by means of the pin 158 and has an arm 160 extending outwardly therefrom over the frame 132. A bolt 162 is threaded into the frame 132 and is contained within a hole 164 formed in the arm 160 of the gage bar 126 so that rotation of the bolt 162 may serve to adjust the inclination of the gage bar 126. A compression spring 166 encircles the bolt 162 and is interposed between the arm 160 and frame 132 to maintain the arm 160 in engagement with the head of the bolt 162.

Figure 11:
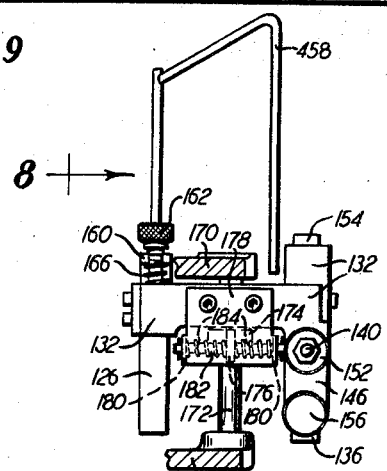

Each of the forepart gages 124 is supported in the machine by means of a C-shaped bracket 168 having a pair of inwardly extending legs 170. Each of the C-shaped brackets 168 is pivotally mounted at the pin 165 to a laterally extending clevis 167 which in turn is pivotally mounted to the lower sub-frame 12 by means of the bracket 169 and pin 171. The head end of each of the motors 122 is pivotally mounted to a bracket 173 by means of the pin 175, each bracket 173 being in turn secured to the lower sub-frame 12. The piston rod 123 of each of the motors 122 is pivotally connected to its associated clevis 167 by means of the pin 177 so that as the motors 122 are actuated the clevises 167, brackets 168 and forepart gages 124 may swing inwardly towards or outwardly away from the periphery of the forepart of the last when the last is supported in the machine. As may be seen from FIGS. 12 and 13 the brackets 168 are guided in their movement towards and away from the last by means of rollers 179 that are rotatably mounted to the underside of each of the brackets 168 and depend into slots 181 formed in a guide bracket 183 which in turn is secured to each side of the lower sub-frame 12. Referring to FIGS. 8, 10 and 11 a heightwise extending rod 172 connects the ends of the legs 170 of the bracket 168. Each of the rods 172 supports the frame 132 of a forepart gage 124 for rotation thereabout by means of a collar 174 that is secured to each rod 172. Secured to and extending outwardly from each collar 174 is a finger 176. A clip 178 is secured to and depends from the frame 132 and has a pair of ears 180 that extend inwardly beneath the frame 132. A rod 182 that is suspended between the ears 180 of each clip 178 passes through a hole formed in the finger 176. A pair of compression springs 184 encircle the rod 182 on opposite sides of the finger 176 and are compressed between the ears 180 of the clip 178 to bias the frame 132 and hence the gage bars 126, 128 in a neutral position illustrated in FIG. 12 while enabling the frame 132 and gage bars 126, 128 to yieldably pivot about the rods 172 when brought to bear against the last L (see FIG. 27).

With the last L locked in position and the gage bars 126, 128 in engagement with the bulge 129 of the last, the last is in readiness to have the conditioned insole applied to the bottom theerof. The conditioning of the insole I includes overmolding of the insole to a contour similar to but exaggerating that of the bottom of the last and also applying adhesive to the insole so that when the insole is brought to bear against the last bottom it may adhere thereto. For this purpose an insole overmolding unit 186 that includes a molding member 188 and a resilient pressing pad 190 is incorporated into the machine. Referring to FIG. 1 it may be seen that the molding member 188 is normally located above the last support 16 and toe support 68. The molding member 188 is mounted for movement from this position to a more rearward position that is away from the last for a purpose later described. The resilient pressing pad 190 is mounted for heightwise movement that is towards and away from the last so that when the molding member 188 is in its forward position over the last L the pressing pad 190 may be moved downwardly to bear against the molding member 188 and when the molding member 188 is in its rearward and out-of-the-way position the pad 190 may move downwardly into engagement with the bottom of the last L. Inasmuch as the heelseat and forepart portions of the last are relatively flat, overmolding of the corresponding parts of the insole is generally unnecessary. For this reason the mold member 188 does not extend the full length of the insole but is only adapted to engage the insole between the breast line and forepart regions thereof where the curvatures of the last are substantial. The degree of curvature of the various portions of the mold member 188 is generally greater than corresponding portions of the last L and is such that when the pressing pad 190 forces the insole therebetween the continuity of the fibers of the insole will become disrupted to a degree sufficient to substantially reduce the elasticity of the insole material.

Referring to FIGS. 1, 14, 15 and 16 the bottom of an L-shaped mold support 192 is pivotally mounted to a lug 194 that depends from the underside of the lower subframe 12 by means of the pin 196 and clevis 198 formed integrally with the mold support 192. The mold support 192 extends upwardly of the lower sub-frame 12 and has a smooth-surfaced top plate 200 secured to the top thereof. The mold member 188 is supported on the top plate 200 in a manner later described and is movable with the support 192. Movement of the support member 192 is effected by means of an air operated motor 202 that is secured to the frame 10 and has an upwardly extending piston rod 204 which in turn is secured, by means of the pin 206 and clevis 208, to a lug 210 that is secured to and extends rearwardly from the lower portion of the mold support 192. When the piston rod 204 of the motor 202 is in its extended position illustrated in FIGS. 1, 16 and 17, the support 192 is in its most forward position and the mold member 188 supported thereon is disposed above the last L. Adjustment of the forward position of the mold support 192 is facilitated by a stop bolt 211 that is mounted to the mold support 192 is engageable with an extension 213 of the lower sub-frame 12 (see FIG. 16). When the piston rod 204 is retracted downwardly the mold support 192 swings rearwardly about the pin 196 thus carrying the mold member 188 rearwardly away from its position above the last L. Means, later described, are provided for retaining the insole in its position above the last so that when the mold member 188 is retracted rearwardly, the insole may fall onto the bottom of the last.

Figure 5:
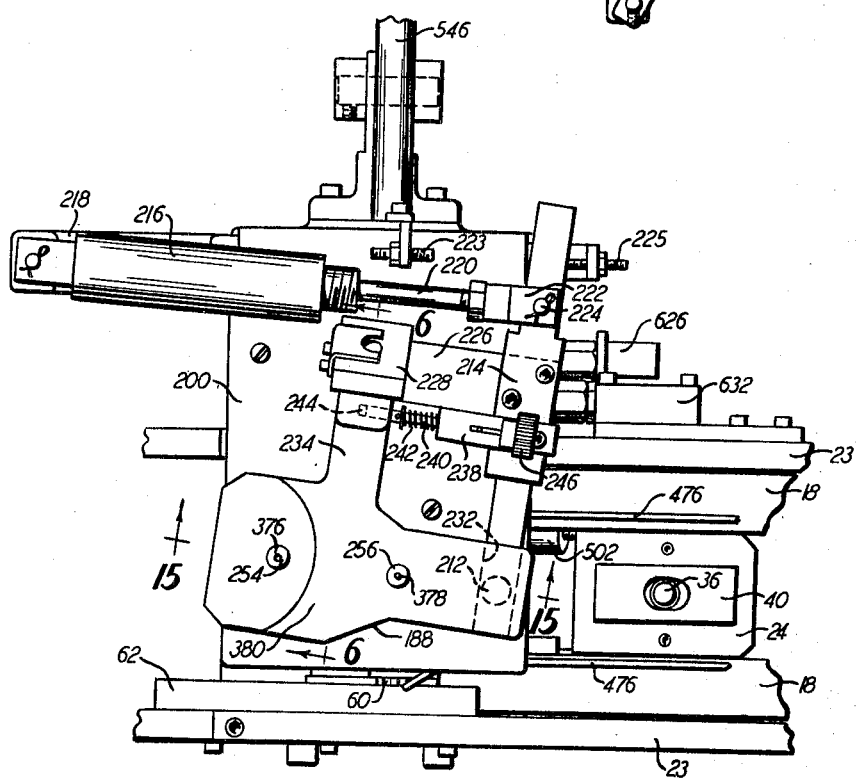
Figure 6:
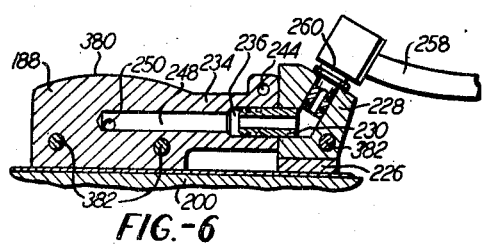

The mold member 188 is disposed in a generally heelward-toeward direction and is pivotally mounted at its heelward end to the top plate 200 of the support 192 by means of the pivot pin 212 (see FIGS. 5 and 15). This pivotal mounting of the mold member 188 serves to permit adjustment thereof so as to enable the machine to operate on either right or left insoles. A drive mechanism is connected to the mold member 188 to effect the pivotal movement thereof and includes a pivot bar 214 that extends in a generally forward-rearward direction and is pivotally mounted to the pin 212 which is in turn securely fastened to the top plate 200 and extends upwardly therefrom. An air operated motor 216 is pivotally mounted to a bracket 218 and has a heelwardly extending piston rod 220 that is pivotally connected to the rearward end of the pivot bar 214 by means of the clevis 222 and pin 224. The limits of movement of the bar 214 are determined by stop screws 223 and 225 which are mounted on the mold support 192 and are disposed in the plane of rotation of the bar 214. Extending forwardly from the midportion of the pivot bar 214 is a pivot bar extension 226 at the end of which is rigidly mounted a fitting 228. Referring to FIGS. 5 and 6 a hollow ferrule 230 is secured to and extends forwardly from the fitting 228. The mold member 188 has a lateral slot 232 formed in its bottom surface for accommodation of the forward end of the pivot bar 214 and enables the mold member 188 to slide in a forward-rearward direction along the pivot bar 214. Formed integrally with the mold member 188 and extending rearwardly therefrom towards the fitting is a neck 234 having a bore 236 formed at the end thereof for mating accommodation with the ferrule 230 of the fitting 228. Thus the mold member 188 may be placed on the top plate 200 with the forward end of the pivot bar 214 disposed within the slot 232 thereof and the mold member 188 may then be urged rearwardly to mate the ferrule 230 with the bore 236 thus facilitating changing of mold members if desired. Means for retaining the mold member 188 in this position are provided and include a lug 238 that extends upwardly from the midportion of the pivot bar 214 and a toewardly extending pin 240 that is slidably contained within the lug 238 and is biased in a toeward direction by means of the compression spring 242. A hole 244 is provided in the neck 234 of the mold member 188 for accommodation of the pin 240 to lock the mold member 188 in place. Retraction of the pin 240 from hole 244 facilitated by means of a knob 246 that is secured to the other end of the pin 240. A passageway 248 is formed within the mold member and is in communication with the bore 236 in the neck thereof. The other end of the passageway 248 is in communication with the passageway 250 and the passageway 252 that are formed within the mold member 188 and are in communication with the dispensing plugs 254 and 256 respectively contained in the mold member 188. A source of cement (not shown) may be connected to the fitting 228 by means of a hose 258 and fitting 260 from which it may be seen that adhesive may flow from the source through the hose 258 into the fitting 228, through the ferrule 230 and into the passageways 248, 250 and 252 of the mold member whereupon adhesive may be dispensed from the plugs 254 and 256 thereof. By way of example, an adhesive pumping device such as disclosed in U.S. application Ser. No. 648,720, filed June 26, 1967, may be incorporated into the instant machine to effect the dispensing of adhesive to the last L and insole I. It should be noted that the pressing pad 190 should be wide enough so that when moved downwardly it may fully engage the molding member 188 when in its right or left position.

Figure 22:
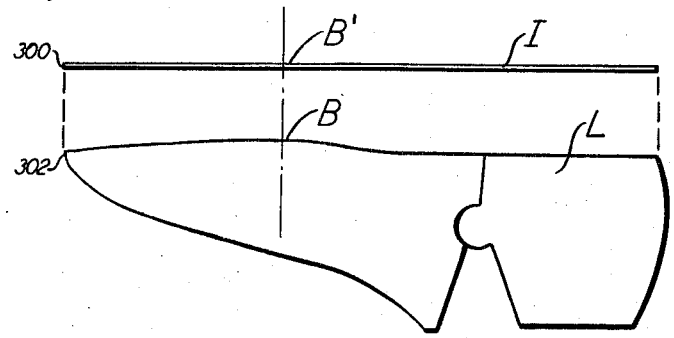

To briefly recapitulate, after the last has been locked in the machine, the forepart gages 124 have been swung inwardly into engagement with the bulging side forepart portions of the last and with the mold support 192 in its forward position such that the mold member 188 is located above the last, the insole I is introduced to the machine. The insole is placed on the mold member and is urged toewardly until the tip of the insole I engages an insole toe gage 262 which aids in positioning the insole in its desired position in the machine. The desired position of the insole I is such that the ball portion B' of the insole I is disposed above and rests on the ball portion B" of the mold member 188 (see FIG. 29). It may be seen that the proper position of the last L with respect to the mold member 188 is such that the ball portion B of the last L is in vertical alignment with the ball portion B' of the mold 188. Thus when the last L and insole I, are properly located in the machine their respective ball portions B and B' are in substantially vertical alignment with the ball portion B" of the mold 188. The insole toe gage 262 is mounted in the machine for heelward-toeward movement so as to enable the gage 262 to be adjusted to accommodate various sizes of insoles. The gage 262 is suspended from a block 264 that is in threaded engagement with a heelwardly-toewardly extending screw 266, the screw 266 being rotatably mounted in the bracket 268 which is in turn secured to the upper sub-frame 14. Thus as the screw 266 is rotated, and the block 264 and gage 262 supported therefrom may be moved toewardly or heelwardly depending on the direction of rotation of the screw 266. Rotation of the block 264 is precluded by means of a bar 265 that is mounted to bracket 268 and which is embraced by bifurcations 267 formed in the block 264. Rotation of the screw 266 is effected by means of a hand wheel 270 which is rotatably mounted to the upper subframe 14 by means of the bracket 272. The hand wheel 270 is operatively connected to the screw 266 by means of beveled gears 274 that connect the shaft 276 of the hand wheel 270 to an extension 278 of the screw 266. The insole toe gage 262 is connected with the last toe gage 88 in such a manner that when the hand wheel 270 is rotated to effect adjustment of the insole toe gage 262 for a particular size shoe the last toe gage 88 will be similarly moved in unison therewith so that the last toe gage 88 will be in the proper position for the corresponding last. The connection between the insole toe gage 262 and the last toe gage 88 includes a rod 280, one end of which is threaded and is rotatably contained in a downwardly extending bifurcated portion 282 of the block 264. A nut 284 is embraced by the bifurcations of the block 264 and is in threaded engagement with the threaded end of the rod 280 so that rotation of the nut 284 may effect heelward-toeward movement of the rod 280. A guide 286 is suspended from the upper sub-frame 14 and serves to support the other end of the rod 280. Secured to the other end of the rod 280 and extending downwardly threefrom is an arm 288 the lower end of which is connected to the end of a rod 290 (see FIGS. 7, 9 and 12). The rod 290 extends heelwardly and is connected to the block 90 to which the last toe gage 88 is supported by means of the clevis 292 and pin 294. The block 90 is slidably supported in a guideway 296 formed on the lower sub-frame 12 for heelward-toeward movement. Gibs 298 retain the block 90 within the guideway 296. It may thus be seen that as the hand wheel 270 is rotated it causes simultaneous adjustment of both the insole toe gage 292 and the last toe gage 88 to set the machine for operation on a different size last and insole combination as indicated on the associated pointer 297 and gage 299. Rotation of the nut 284 causes heelward-toeward movement of the rod 280 and consequently, through the aforementioned connections, corresponding movement of the last toe gage 88 with respect to the insole toe gage 262. This adjustment feature facilitates the accommodation of lasts of different styles and in particular where the difference in style between lasts is in the degree of curvature in the ball region B of the last L. For example FIG. 22 illustrates a relatively flat last and a corresponding insole I disposed above the last and having the ball portion B' of the insole located above and in alignment with the ball portion B of the last L. It should be noted that in this arrangement the toe tip 300 of the insole I is located directly above the toe tip 302 of the last L. By way of contrast FIG. 29 illustrates a last L of relatively high-heeled style having a relatively sharp curvature at the ball region B thereof and an insole disposed above the last L, the ball portions B, B' of the last L and insole I being in alignment. It should be noted that with the high-heeled last L the tip 304 of the insole I tends to overhang and extend beyond the tip 306 of the corresponding last whereas with the relatively flat last there is no overhang of the insole. The extent of overhang is indicated by the arrow 308 in FIG. 29. Thus in order to properly align the ball portions of the insole and last the toe gages 88 and 262 must be properly set with respect to each other to allow for the proper amount of overhang of the insole if any. This is effected by means of rotation of the nut 284 to cause the rod 280, the arm 288, the rod 290, the block 90 and the last toe gage 88 to be moved heelwardly or toewardly with respect to the insole toe gage 262.

Referring to FIGS. 17, 19 and 17A the insole toe gage 262 is of a three-walled construction that includes a side wall 310, a front wall 312 and a top wall 314. The more forwardly disposed ends of the top wall 314 and front wall 312 are flared outwardly (see FIGS. 17, 17A) to facilitate insertion of the toe end of the insole against the corner formed by the junction of the walls of the gage 262. It should be noted here that some insoles are of a construction such that the heel portions thereof are relatively heavy. When such an insole is placed on the mold member 188 it may tend to tip heelwardly and fall from the mold 188. The engagement of the tip of the insole with the top wall 314 of the gage 262 insures that the insole will be retained in position on the mold member 188.

With the gages 88 and 262 properly adjusted for the particular size and style of last L, the insole is presented to the machine and the pressing mechanism is actuated to effect a pressing of the insole to the mold member 188 to overmold the insole. Referring to FIGS. 1, 17, 19, 20 and 21 the pressing mechanism includes a pair of heightwise extending rams 316 that are mounted to the upper sub-frame 14 above the mold member 188 for heightwise movement that is towards and away from the molding member 188. The rams 316 are rigidly connected to each other and are spaced apart by means of an upper spacer 318 and a lower spacer 320. A pair of guide rails 322, 324 embrace each ram 316 and are secured to each side of the upper sub-frame 14 by means of bolts 326 that extend through the sub-frame 14 and are threaded into the guide rails 322, 324 themselves. Each of the guide rails 322, 324 is provided with a bearing surface 325 that is adapted to directly contact and guide the edges of the rams 316 in their heightwise movement. In order to provide for normal wearing of the bearing surfaces 325 the mounting of the more heelward guide rails 322 is such that they may be readjusted to a more toeward position to compensate for such wear. This mounting is effected by means of providing enlarged holes in the upper sub-frame 14 through which the bolts 326 may pass to enable the bolts 326 and guide rails 322 to be moved toewardly in unison within the limits of the holes and then retightened to the upper sub-frame 14. A pair of upper and lower retaining brackets 328 and 330 are secured to the upper sub-frame 14. Each of the brackets 328, 330 is secured to its associated more toeward guide rail 324 by means of a bolt 332 (see FIG. 1) and serves to captivate each set of guide rails 324 and 322 therebetween. Disposed at the heelward end of each of the retaining brackets 328, 330 is a stop-bolt 334 that extends towards and abuttingly engages its associated heelward guide rail 322. The purpose of these stop-bolts 334 is to preclude shifting of the more heelward guide rail 322 from its preset position in response to forces exerted on the rams 316 in a non-heightwise direction. Thus, should it become necessary to readjust the position of the more heelward guide rails 322, after the readjustment has been effected, the stop bolts 334 are rotated so as to abuttingly engage the guide rails 322 and maintain the bearing surfaces 325 of the guide rails 322, 324 in full contact with the edges of the rams 316. The resilient pressing member 190 is mounted to the lower ends of the rams 316 in a manner later described.

Heightwise movement of the rams 316 is effected by a drive mechanism that includes a heelwardly-toewardly disposed lever 336 that is pivotally connected at the pin 338 to the rams 316 by means of a pair of bushings 340 that are secured to the rams 316. The other end of the lever 336 is pivotally connected by means of a pin 342 and clevis 344 to the piston rod 346 of an air operated motor 348, the other end of the motor 348 being pivotally secured at the pin 350 to a bracket 352 that is mounted to and depends from the lower sub-frame 12. The lever 336 is fulcrumed at a point intermediate its ends and the fulcrum is movable between the ends of the lever 336 to enable the mechanical advantage of the lever 336 to be varied for a purpose later described. Referring to FIGS. 19, 20, 21, 23 and 24 the construction of the movable fulcrum includes a bifurcated bar 354 that is swingably suspended from the upper sub-frame 14 by means of a shaft 356 to which the bar 354 is keyed. The shaft 356 extends rearwardly from the upper sub-frame 14 and has an arm 358 secured to the rearwardly extending portion thereof. The arm is pivotally connected at the pin 360 to the piston rod 362 of the air operated motor 364 which is in turn pivotally mounted to the upper sub-frame 14 at the pin 366 by means of the bracket 368. Thus actuation of the motor 364 effects a swinging of the bar 354 between a heelward and a toeward position. Secured to and extending between the depending bifurcations of the bar 354 is a pin 370 having a roller 372 rotatably mounted thereon. The roller 372 is contained within a slot 374 that is formed in the lever 336. The slot 374 is of a curved configuration and is disposed at a slight incline to the horizontal but in a substantially heelward-toeward direction so that as the bar 354 and rollers 372 are swung heelwardly or toewardly the distance between the fulcrum and the pin 338 that connects the rams 316 and to the lever 336 and hence the mechanical advantage may be varied accordingly.

Figure 23:
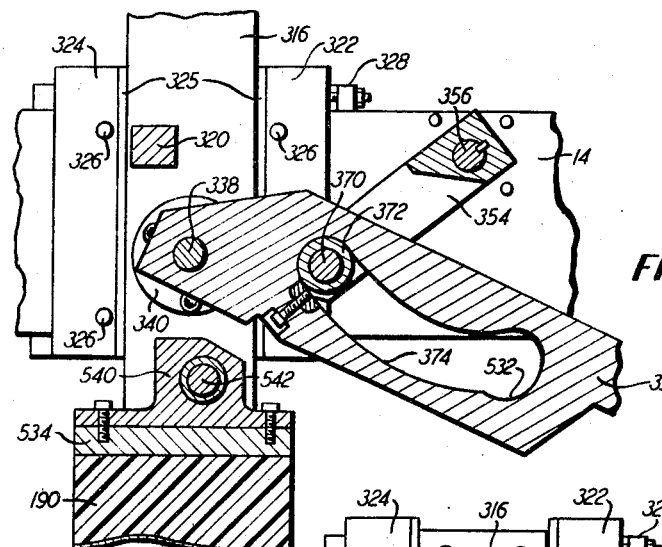

After the insole I has been properly located on the molding member 188 the pressing mechanism is actuated to mold the insole to the contour of the molding member 188. Inasmuch as a greater force is required to properly overmold the insole than in pressing the insole into flush engagement with the bottom of the last, the motor 364 is initially actuated to swing the bar 354 toewardly, thus sliding the fulcrum pin 370 and roller 372 toewardly within the slot 374 and consequently increasing the mechanical advantage of the lever 336 so that when the motor 348 is actuated the pad 190 may be urged downwardly with an increased force. It may be noted that as the bar 354 and roller 372 are swung toewardly, the inclination of the slot 374 formed in the lever 336 will cause the toeward end of the lever 336 to swing downwardly (as illustrated in FIG. 23) about the pin 370 the effect of which is to carry the rams 316 and pressing member 190 mounted thereto downwardly into proximity with the insole and mold member 188 so as to be in readiness for the subsequent actuation of the motor 348 to urge the rams 316 and pressing member 190 downwardly in over-molding the insole.

While the insole is being pressed to the insole mold 188, adhesive dots are caused to be applied to the insole I and also to the last L. A dot D of adhesive is applied to the insole at the shank area and at a point just forward of the ball of the insole I and a dot D of adhesive is also applied to the last bottom and the toe region thereof (see FIG. 27). Referring to FIGS. 5 and 15 the adhesive dots D are applied to the insole I by means of discharge orifices 376 and 378 that are located in the molding surface 380 of the molding member 188. The orifices 376 and 378 are formed in the plugs 254 and 256 that are contained in the mold member 188. The upper surface of the plugs 254 and 256 may be slightly recessed below the surface 380 of the mold member 188 to form a slight depression about each orifice. The orifices 376 and 378 are in communication with the passageway 248 that is formed in the mold member 188. Heaters 382 may be provided in the mold member 188 to maintain the adhesive at the desired temperature (see FIG. 6.).

The depositing of the dot of adhesive at the toe end of the bottom of the last is effected by means of a toe bonding unit 384 that is supported on the toeward end of the lower sub-frame 12. Referring to FIGS. 7, 9 and 9A the toe bonding unit 384 includes a nozzle 386 that is adapted to be brought into engagement with the bottom of the toe end of the last whereupon adhesive may be forced through the nozzle 386 and onto the last L to form the dot D of adhesive thereupon. The construction of the toe bonding unit 384 includes a pair of upright supports 388 that are mounted to and extend upwardly from the top plate 77 of the lower sub-frame 12. Guideways 390 are formed in the facing surfaces of the supports 388 and serve to retain a slide plate 392 therein for sliding movement in a heelward-toeward direction. Movement of the slide plate 392 is effected by means of an air operated motor 394 having one end thereof pivotally secured to the frame 10 at the pin 396 and having its piston rod 398 thereof extending heelwardly therefrom and being connected to a depending portion 400 of the slide 392 by means of the clevis 402 and pin 404. Mounted atop the slide 392 for sliding movement thereon in a heelward-toeward direction is a heelwardly extending support member 406. Pivotally mounted at the pin 408 to the heelward end of the support member 406 and extending upwardly therefrom are a pair of spaced guide bars 410 having guideways 412 formed in the facing surfaces thereof. A key 414 is slidably contained within the guideways 412 and is connected at the pins 416 to protrusions 418 that are formed integrally with a nozzle holder 420 and which are disposed between the guide bars 410. An air operated motor 422 is secured to the upper end of the guide bars 410 by means of the bracket 424 and has a downwardly extending piston rod 426 that is connected to the upper end of the nozzle holder 420. It may be seen that actuation of the motor 422 will cause the nozzle holder 420 to move heightwise in a path paralleling that of and being guided by the movement of the key 414 within the guideways 412. The nozzle 386 is secured to the lower end of the nozzle holder 420 and a passageway 428 is formed in the nozzle holder 420 and serves to communicate the nozzle 386 with a fitting 430 that in turn may be connected to a source of adhesive. It is desirable that the nozzle 386 contact the bottom of the last in a flush configuration to preclude leakage of adhesive beyond the confines of the nozzle outlet and for this purpose the inclination of the guidebars 410 may be varied to accommodate the particular last. The arrangement for effecting this adjustment includes an arm 432 that is secured to and extends toewardly of the guidebars 410. A nut 434 is pivotally mounted between toewardly extending bifurcations 436 of the arm 432. A screw 438 is threaded into the nut 434 and is rotatably mounted to a clevis 440 which in turn is pivotally mounted to the toeward end of the support 406 at the pin 442. It may thus be seen that as the screw 438 is rotated, the guidebars 410 and nozzle holder 420 will pivot about the pin 408 thereby effecting adjustment of the inclination of the nozzle 486. Adjustment of the nozzle holder 420 and nozzle 386 in a heelward-toeward direction is accomplished by means of a heelwardly-toewardly disposed screw 444 that is rotatably mounted at its ends to a pair of journals 446 which are secured to and extend upwardly from the slide 392. The screw 444 is in threaded engagement with the bracket 406 wherefrom it may be seen that rotation of the screw will effect heelward-toeward movement of the bracket 406 and all members supported thereon.

The toe bonding unit 384 is normally in its toeward, out-of-the-way position illustrated in FIGS. 1 and 9. When the motor 394 is actuated the slide 392 and nozzle 386 supported thereon are urged heelwardly towards the last support 16 until the plunger 448 of the valve 450, which is mounted to the slide 392, engages a bearing surface 452 formed on the block 90 whereupon the valve 450 is actuated. The actuation of the valve 450 in turn causes actuation of the motor 422 to drive the nozzle holder 420 downwardly thus bringing the nozzle 386 to bear against the bottom of the toe of the last L in readiness to distribute adhesive thereto. The screw 444 should be adjusted to locate the nozzle 386 in its proper position on the slide 392 so that when the slide 392 and the nozzle 386 terminate their heelward movement the subsequent downward movement of the nozzle 386 will cause the nozzle to bear against the desired portion of the last bottom.

After the rams 316 have moved downwardly to press the insole I into conformity with the contour of the mold member 188, for a predetermined length of time the rams 316 and pressing member 190 are retracted upwardly out of engagement with the insole I and mold member 188 and the mold support 192 and mold member 188 mounted thereto are retracted rearwardly to an out-of-the-way position by means of actuation of the motor 348. As the mold member 188 is withdrawn rearwardly the overmolded insole is retained in its position above the last L so that the insole may fall directly onto the bottom of the last L. The means for retaining the insole in a position that is above the last L includes a downwardly extending finger 454 that is secured to the upper subframe 14 by means of the bracket 456. The finger 454 is disposed in the machine so as to engage the heelward, overhanging portion of the insole I as the mold member 188 is withdrawn rearwardly. The toe end of the insole I is retained in position by means of a wire-like cage 458 that is mounted to and extends upwardly from the more rearward of the forepart gages 124. Thus when the mold member 188 has been retracted to its rearward, out-of-the-way position it is no longer supportive of the insole I and the insole may fall onto the bottom of the last L. Means are provided for guiding the insole I in its fall from the mold member 188 onto the last bottom and includes another wire-like cage member 458 that is supported on and extends upwardly of the more forward of the forepart gages 124 and cooperates with the more rearward cage 458 to embrace the toe end of the insole I. The heel end of the insole I is guided in its fall by means of another finger 460 that is supported on the upper sub-frame 14 forwardly of the downwardly extending stationary finger 454 and is movable from a remote position illustrated in FIGS. 1 and 17 to a downward position paralleling that of the more rearward finger 454. When the finger 460 is in its operative downwardly extending position it cooperates with the finger 454 to embrace the heel end of the insole I. The finger 460 is mounted to the forward position of the upper subframe 14 by means of a bracket 462 and a pin 464 that is mounted between the bracket 462 and the upper subframe 14. An arm 466 which is pivotally mounted to the pin 464 is connected to the piston rod 468 of an air operated motor 470 at the pin 472. The finger 460 is secured to the downwardly extending end of the arm 466. The motor 470 is pivotally mounted at the pin 474 to the upper sub-frame 14 wherefrom it may be seen that actuation of the motor 470 may be effected to swing the finger 460 from its out-of-the-way, heelward position to a toeward and downwardly extending position that is embracive of the heel end of the insole I. In addition to the aforementioned guiding means a supplemental guiding means is provided and includes a pair of toewardly extending wires 476 that are pivotally mounted to the heelward end of the carriage 18 by means of a shaft 478 that is rotatably supported within a bracket 480 mounted on the heel end of the carriage 18, the wires 476 being secured to the ends of the shaft 478. The wires 476 are laterally spaced so that when the shaft 478 is rotated (in a clockwise direction as seen in FIGS. 2 and 5) the wires 476 will swing upwardly and embrace the last L, the toeward ends of the wires 476 extending upwardly beyond the last bottom to embrace the shank portion S of the insole I as it falls onto the last L bottom. Rotation of the shaft 478 is effected by means of an air operated motor 482 which is pivotally mounted at one end thereof to a depending portion 484 of the carriage 18 and has an upwardly extending piston rod 486 that is pivotally mounted at the pin 488 to a heelwardly extending lever 490 to which the shaft is secured.

The forementioned guidemeans serve the purpose of locating the insole I in general registry on the bottom of the last L. It is necessary however to locate the insole in final registry with the last bottom. A heel locating unit 492 is provided for this purpose and to aid in maintaining the insole in such registry while it is being pressed into adhesion with the bottom of last L. Referring to FIGS. 2, 3 and 4 the heel locating unit 492 is supported from the rearward end of the carriage 18 and includes a pair of toewardly diverging gage plates 494 that are supported on the upper end of a rod 496. The rod 496 is mounted to a lever 498, the lower end of which is pivotally mounted to a depending member 500 that is secured to the heelward end of the carriage 18. An air operated motor 502 is pivotally mounted to a bracket 504 that is secured to the underside of the carriage 18. The piston rod 506 of the motor 502 is connected to a link 508 that is in turn pivotally connected at the pin 510 to the lever 498 so that actuation of the motor 502 may effect a swinging movement of the gage plates 494 between a heelward and upward out-of-the-way position and a toeward, downward operating position wherein the gage plates 494 are in engagement with the periphery of the heel end of the last L. Means are provided for enabling the gage plates to be adjusted for operation on different sizes and styles of lasts to insure that they contact the exact periphery of the bottom of the last when brought into engagement with the last. For this purpose the upper end of the rod 496 has a slot 512 formed therein for sliding accommodation of a lug 514 that is formed integrally with a gage mount 516. A set screw 518 is threaded into the lug 514 and protrudes forwardly through another slot 520 that is formed in the upper end of the rod 496 so that after the lug 514 has been moved to its desired position along the slot 512 the set screw may be tightened to retain the gage mount 516 in that position. The gage mount 516 is also pivotally connected to one end of a link 522, the other end of the link 522 being pivotally connected to the rod 496. It may be seen that movement of the lug 514 within the slot 512 and along the length of the rod 496 may effect a tilting adjustment of the gage plates 494. The gage plates 494 are secured to a pivot block 524 that is contained within a recess 526 formed in the gage block 516 and which is pivotally mounted to the gage block 516 by means of a pin 528. A compression spring 530 interposed between the recess 526 of the gage mount 516 and the pivot block 524 serves to bias the gage plates 494 in a neutral position indicated in FIGS. 2 and 3 yet enabling the gage plates 494 to be self accommodating to the periphery of the heel end of the last L.

After the insole I falls onto the bottom of the last L the control circuit of the machine causes the motor 502 to be actuated thus swinging the gage plates 494 toewardly and downwardly into engagement with the periphery of the heel end of the insole I and last L and simultaneously urging the periphery of the toe end of the insole into abutting engagement with the forepart gages 124. The heel gage unit 492 is maintained in this position during the remainder of the cycle of operation of the machine to insure that the insole I is maintained in registry on the bottom of the last L. It should be noted however that as a result of the overmolding operation the insole assumes relatively sharp curvatures of such a degree that when the insole is initially located on the last bottom it may not extend fully between the toe and heel ends of the last thus rendering the forepart gages 124 relatively ineffective in locating the insole in registry on the last bottom. It may be seen however that as the pressing pad 190 is brought downwardly and engages the insole I to remold and press the insole to the last bottom the insole will tend to flatten and spread out whereupon the periphery of the toe and heel end thereof will be urged towards engagement with the forepart gages 124 and the gage plates 494.

When the forepart gages 124 where initially swung inwardly to engage the forepart of the last L, they engaged the last L in the bulging regions 129 thereof as illustrated in solid lines in FIG. 28. Although this proves satisfactory in clamping the last in the machine it is unsatisfactory for the purpose of locating the insole in perfect registry on the bottom thereof. When registering the insole I on the bottom of the last L it is necessary that at least one of the gage bars 126 or 128 be inclined to an attitude illustrated in phantom in FIG. 28 wherein the gage bar 128 is in direct contact with the periphery of the forepart of the last L. This is effected by means of introducing higher pressured air to the motors 122 to cause the forepart gages 124 to be urged inwardly under a greater force which is sufficient to overcome the force of the springs 142 and to enable the heelward gage bars 128 to be inclined at the desired attitude. It is preferable that the pressing pad 190 does not engage the insole I to press the insole to the last bottom until after the gage bars 128 have been inclined to the attitude wherein they engage the periphery of the forepart of the last L so as the pressing pad 190 causes the insole I to be spread out on the last bottom it will spread into registry with the last bottom.

Figure 24:
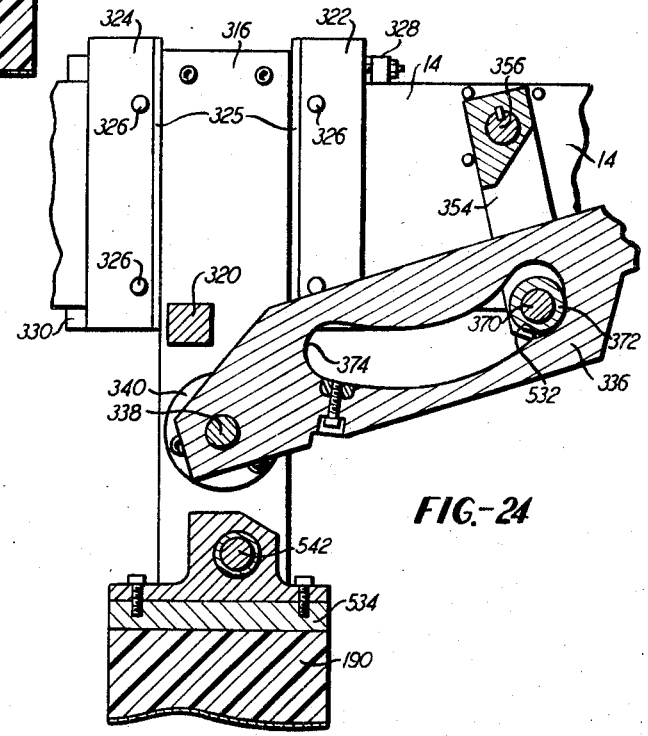

Before the rams 316 are urged downwardly to press the overmolded insole to the bottom of the last L the fulcrum pin 370 is swung to its heelwardmost position illustrated in FIG. 24 to decrease the mechanical advantage of the lever 336 in readiness to press the insole to the last bottom. Referring to FIG. 24 it should be noted that when the motor 348 is fully actuated the lever 336 is swung to its most counterclockwise position wherefrom it may be seen that there is a tendency of the bar 354 and fulcrum pin 370 to slide toward the toeward end of the slot 374. For the purpose of resisting this tendency a cutout portion 532 is formed in the heelward end of the lever 336 and serves to lock the fulcrum pin 370 in the heelward end of the slot 374 as the motor 348 is fully actuated to urge the rams 316 to their full downward position.

Referring to FIGS. 17, 20 and 21 it may be seen that the pressing pad 190 is mounted to and depends from a plate 534 by means of clips 536 that are secured to the sides of the plate 534 and extend into slots 538 formed in the sides of the pad 190. The plate 534 is secured to a pad mount 540 which in turn is pivotally mounted to the lower ends of the rams 316 by means of a pin 542 that is disposed in a forward-rearward direction and is suspended between the rams 316. The plate 534 and pressing pad 190 is biased in the position illustrated in FIGS. 17, 20 and 21 by means of compression springs 544 that are interposed between the upper surface of the plate 534 and the bottom of the rams 316. This arrangement of the pressing pad enables the pad to pivot about the pin 542 to accommodate lasts of both low and high heeled styles.

After the motor 348 has been actuated to urge the rams 316 downwardly thus pressing the insole to the bottom of the last L the control circuit of the machine causes actuation of the motor 394 to urge the toe bonding unit 384 heelwardly and downwardly to bring the nozzle 386 into engagement with the toe portion of insole I. At this time however, adhesive is not extruded through the nozzle 386, the sole purpose of this movement of the nozzle 386 being to act as a forepart press in pressing the insole I to the bottom of the last L and aiding in the securement of the insole I thereto. The pressing pad 190 and nozzle 386 are maintained in pressing relation with the bottom of the insole I for a predetermined length of time, which is controlled by the control circuit of the machine, at the end of which time the various aforementioned motors of the machine are returned to their idle positions to enable the assembled insole and last to be ejected from the machine. As the motors are returned to their idle position the motor 30 is actuated to cause a downward retraction of the last pin 36 below the level of the last plate 40 whereupon the control circuit effects actuation of the motor 546. Referring to FIGS. 15 and 16 the motor 546 is mounted to the mold support 192 and has a forwardly extending piston rod 548 at the end of which is a bumper 550. When the motor 546 is actuated the bumper 550 is urged forwardly into engagement with the last L and knocks the last L forwardly off the carriage 18.

The carriage 18 is caused to be returned to its heelward, idle position by means of a motor 636 that is mounted to the top plate 77 (see FIG. 7) and has a piston rod 637 that extends heelwardly towards the carriage 18. At the end of the cycle of operation of the machine the control circuit causes the motor 636 to be actuated. The piston rod 637 is extended heelwardly and engages the then unlocked carriage 18 to urge the carriage 18 to its heelward, idle position, whereupon the piston rod 637 of the motor 636 immediately retracts to its idle position.

Figure 30:
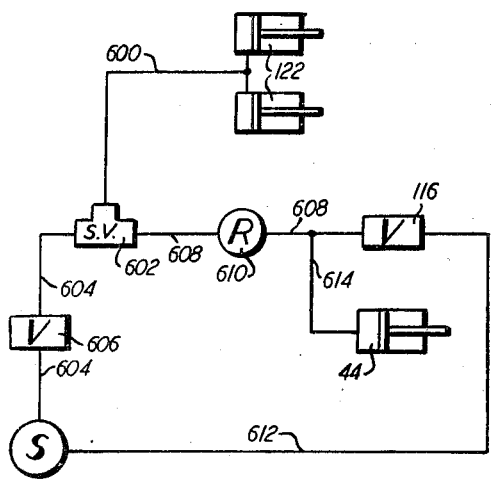
FIG. 30 is a schematic illustration of the portion of the control circuit that controls the operation of the forepart gages.

Summarizing the operation of the machine the operator places a last L, bottom up on the last support 16 with the last pin 36 inserted within the thimble T of the last L and with the vamp portion V of the last resting on the toe rest 70. The last L is then manually urged toewardly drawing the carriage 18 therewith to bring the tip of the toe of the last into engagement with the last toe gage 88. The toeward movement of the last causes the toe gage 88 to slide toewardly thus actuating the valve 116. The valve 116 is interposed in the control circuit of the machine such that upon actuation thereof the motors 122 are actuated to effect a swinging of the forepart gages 124 inwardly to cause them to bear against the bulging portion 129 of the last L under a relatively low pressure of a degree such that the force of the compression springs 142 may not yet be overcome. This portion of the control circuit of the machine is schematically illustrated in FIG. 30 from which it may be seen that the head end of each of the motors 122 is connected by means of the line 600 to the outlet of a shuttle valve 602. The shuttle valve 602 is connected to a source S of air under relatively high pressure by means of the line 604, there being a valving arrangement 606 interposed along the line 604 to alternatively preclude or permit the flow of air from the source S to the shuttle valve 602. The shuttle valve 602 has another inlet port that is ultimately connected to the valve 116 by means of the line 608 there being a pressure regulator 610 interposed along the line 608 to enable the air passing therethrough to the shuttle valve 602 to be reduced to a pressure that is lower than that of the source S. The valve 116 is connected by means of the line 612 to the source S. When the machine is in an idle position the valving arrangement 606 precludes the flow of air from the source S through the line 604 to the shuttle valve 602 so that when the valve 116 is actuated relatively low pressure air may be directed through the line 608, through the shuttle valve 602, through the line 600 and into the head end of each of the motors 122 to urge the forepart gages 124 inwardly under a relatively low pressure. The construction of the shuttle valve 602 is such that when the valving arrangement 606 is later actuated to enable air to flow through the line 604 the flow of relatively low pressure air through the shuttle valve 602 will be terminated and the high pressure air will flow through the shuttle valve 602, through the line 600 and into the motors 122 to urge the forepart gages 124 inwardly under a higher pressure sufficient to overcome the force of the springs 142. Actuation of the valve 116 also causes air to be directed from the line 608 through line 614 to the motor 44 thus locking the last L and carriage 18 in place. The control circuit then causes the machine to come to a rest to enable the operator to inspect the position of the last and various parts of the machine and to enable the operator to introduce the insole to the machine.

The insole I is then placed on the mold 188 with the toe end thereof in engagement with the insole toe gage 262, the insole toe gage 262 and last toe gage 88 having been previously adjusted for the size and style of last which is to be operated on by the machine (see FIG. 29). The motor 202 is normally in a position such that the mold support 192 is in its most forward position so that the mold member 188 may be disposed below the pressing pad 190 and above the last L. With the insole I resting on the mold 188 the control circuit is reactivated by the operator to continue the cycle of operation of the machine.

In resuming operation, the control circuit causes the motor 364 to be actuated to swing the arm 354 and the fulcrum pin to its most toeward position illustrated in FIG. 23, the lever arm 336 pivoting slightly to bring the rams 316 and pressing pad 190 downwardly into proximity with the mold member 188 and insole I supported thereon. It should be noted here that a greater pressing force is required in overmolding the insole I than in pressing it into attachment with the bottom of the last L. To this end the fulcrum pin 370 is moved to its most toeward position thus increasing the mechanical advantage of the lever arm 336 when the overmolding function takes place and is thereafter moved to its most heelward position to decrease the mechanical advantage of the lever 336 in readiness for attachment of the insole to the bottom of the last. At the end of the stroke of the motor 364 the cam 616 that rotates with the arm 354 actuates the valve 618. The valve 618 is incorporated into the control circuit and is effective to direct air under relatively high pressure to the motor 348 to urge the piston rod 346 thereof upwardly thereby causing the lever 336 to pivot in a counterclockwise direction as seen in FIG. 17, thus urging the rams 316 and pressing pad 190 downwardly to press the insole I to the mold member 188. While the insole is being pressed against the mold member 188, adhesive is caused to be pumped through the aforementioned conduits and passageways to the plugs 254, 256 located in the mold member 188 to thereby apply dots D of adhesive to the insole I, the pressing of the insole I to the mold member 188 being effective to seal the orifices 376, 378 formed in the plugs 254, 256 from leaking beyond the periphery of the orifices 376, 378. Actuating of the valve 618 also serves to cause actuation of the motor 394 to move the toe bonding unit 384 heelwardly until the plunger 448 of the valve 450 engages the surface 452 of the block 90 which in turn causes the motor 422 to be actuated thus urging the nozzle holder 420 and nozzle 386 downwardly towards and into engagement with the bottom of the toe end of the last L. It should be noted here that in setting up the machine for operation on a particular size or style of last, the longitudinal position of the toe bonding unit support member 406 and inclination of the guide bars 410 should be adjusted so that when the nozzle 386 engages the bottom of the last L the outlet of the nozzle 386 will be flush with the last bottom so as to preclude the flow of adhesive beyond the periphery of the nozzle outlet. The adhesive applicating device is then caused to pump adhesive through the nozzle 386 and onto the bottom of the last L. The motor 348 is maintained in its actuated position for a predetermined length of time to maintain the pressing pad 190 in pressing engagement with the insole I and the mold 188. The length of time is determined by the character of the insole material and the degree to which the insole is to be overmolded. After the predetermined time has expired a timing device triggers the control circuit to deactivate the motors 348, 394 and 422 to return them to their idle positions wherein the pressing pad 190 is in a raised position and the toe bonding unit 384 is in its toeward, remote position.

While the motor 348 is being returned to its idle position a valve 620, mounted on the machine in a position that is adjacent the piston rod 346 of the motor 348, is actuated by means of a cam 622 that is secured to the piston rod 346. The valve 620 is of the one-way type and is actuable only when the piston rod 346 is moving in a downward direction and raising the pressing pad 190. The valve 620 is interposed in the control circuit of the machine and serves to direct air to the motor 202 to swing the mold support 192 rearwardly thus causing the insole I to drop onto the bottom of the last L. Actuation of the valve 620 also causes air to be directed to the motors 364, 470 and 482 thus respectively swinging the fulcrum arm 354 to its heelward position, pivoting the insole guide finger 460 to its downward position and causing the insole shank guidewires 476 to be pivoted to their raised and operative position.

As the mold support 192 swings towards its rearward out-of-the-way position a lug 624 (FIG. 16) mounted on the mold arm 192 swing with the mold arm toward and into engagement with a valve 626 that is mounted on the rearward side of the lower sub-frame 12. The valve 626 is interposed in the control circuit to cause higher pressure air to be directed to the motors 122 thus causing the forepart gage bars 128 to overcome the force of the springs 142 to tilt inwardly to the position illustrated in phantom in FIG. 28. The actuation of the valve 626 is also effective to cause actuation of the motor 502 to swing the heel gage 492 toewardly and downwardly into engagement with the periphery of the heel end of the bottom of the last L. Actuation of the valve 626 also causes air under relatively low pressure to be directed to the motor 348 to urge the pressing pad 190 downwardly towards the last L under a relatively lower force to thus press the insole I into conforming with the bottom of the last L. Lastly, actuation of the valve 626 also causes air to be directed to the motor 394 to urge the toe bonding unit 384 heelwardly until the plunger 448 of the valve 450 engages the bearing surface 452 of the block 90 whereupon the motor 422 is actuated to bring the nozzle 386 downwardly into engagement with the bottom of the insole I to press the insole to the last bottom. When the insole I falls onto the bottom of the last L it is guided into general registry therewith by the various aforementioned guides. Due to the overmolded condition of the insole, however, it is of shorter length than that of the last bottom (see FIGS. 25 and 27) thus rendering the forepart gages 124 and heel gage 492 ineffective in locating the insole I in final registry on the last bottom. This is particularly true of relatively high heeled shoes. Final registry of the insole occurs while the various gages are maintained in engagement with the bottom periphery of the last and the pressing pad 190 presses the insole to the last bottom. As the insole I is so pressed it flattens out to the contour of the last bottom and spreads into engagement with the various gages to locate the insole into final registry simultaneously with the attaching operation. It should be noted that at this time no adhesive is pumped through the nozzle 386, the nozzle serving the sole purpose of pressing the insole I to the bottom of the last L. The various machine parts are maintained in this position for a predetermined length of time which is governed by a timing device similar to the one referred to above. When the predetermined time has elapsed the control circuit causes the motor 348 to be returned to its idle position thus raising the pressing pad 190 from engagement with the bottom of the last L and also causes air to be directed to the motors 482, 470, 44 and 122 to respectively drop the shank guide wires 476 to their idle position, return the insole drop finger 460 to its upward, out-of-the-way position, swing the last pin 36 heelwardly to unlock the last and unlock the carriage 18 from the lower sub-frame 12 and free the forepart gage 124 from the last L. As the piston rod 346 of the motor 348 continues to move downwardly, the cam 622 on the piston rod 346 actuates the valve 620 thus causing air to be directed to the motors 394, and 422 to return the toe bonding unit 384 to its toeward out-of-the-way position. A valve 630 is also actuated by the cam 622 on the piston rod 346, the valve 630 being interposed in the control circuit as to direct air to the motor 202 to cause the mold arm 192 to be swung forwardly to its normal position. The valve 630 is so positioned that it is actuated by the cam 622 only after the pressing pad 190 has been raised to a level such that it may not interfere with the forward movement of the mold 188 and mold support 192. When the mold support 192 is swung to its most forward position a cam 632 (FIG. 16), mounted thereon actuates a valve 634 that is supported on the lower sub-frame 12, the valve 634 being interposed in the control circuit so as to direct air to the motors 636, 30 and 546 to respectively cause the carriage 18 to be returned to its heelward position, to cause the last pin 36 to be retracted downwardly and out of the thimble T of the last, and to eject the last L from the machine.

We claim:

1. An apparatus for adhesively bonding a surface of a first workpiece to a surface of a second workpiece comprising:
    means for supporting said first workpiece in a predetermined position;
    an adhesive applicator;
    means mounting said adhesive applicator for movement between a first position that is remote from said predetermined position of said first workpiece and a second position wherein said adhesive applicator bears flush against said surface of said first workpiece;
    means for effecting dispensing of adhesive from said applicator while said applicator is in said second position whereby adhesive may be applied to said surface of said first workpiece;
    means for thereafter moving said adhesive applicator to said first position thereof;
    means enabling said surface of said second workpiece to be thereafter applied to said surface of said first workpiece; and
    means for thereafter returning said adhesive applicator to said second position thereof whereby said applicator may engage said second workpiece and effect a pressing of said second workpiece to said workpiece to aid in effecting the adhesive bond therebetween.

2. An apparatus for adhesively bonding a surface of a first workpiece to a surface of a second workpiece comprising:
    means for supporting said first workpiece in a predetermined position;
    an adhesive applicator;
    means mounting said adhesive applicator for movement between a position that is remote from said predetermined position of said first workpiece and an applying position wherein said adhesive applicator is proximate to said surface of said first workpiece to enable said adhesive applicator to apply adhesive to said surface of said first workpiece;
    means for effecting dispensing of adhesive from said applicator while said applicator is in said applying position;
    means for thereafter moving said adhesive applicator to said remote position thereof;
    means enabling said surface of said second workpiece to be thereafter applied to said surface of said first workpiece; and
    means for thereafter moving said applicator from said remote position to a pressing position wherein said applicator engages said second workpiece and effects a pressing of said second workpiece to said first workpiece to aid in the bonding therebetween.

3. An apparatus for adhesively bonding an insole to the bottom of a last comprising:
    means for supporting said last in a predetermined position;
    an adhesive applicator normally disposed in a position that is remote from the bottom of said last in a direction that is both lengthwise of said last and heightwise of said last bottom when said last is in said predetermined position;
    means mounting said adhesive applicator for movement from said remote position thereof lengthwise of and towards said last to an intermediate position wherein said adhesive applicator faces and is disposed in alignment with a predetermined point on said last bottom such that subsequent movement of said applicator towards said last bottom in a direction substantially normal thereto will cause said applicator to be located at said predetermined point on said last bottom;
    drive means for effecting movement of applicator to said intermediate position;
    means responsive to movement of said applicator to said intermediate position to thereafter move said applicator towards and into pressing engagement with said last bottom at said predetermined point on said last bottom and in a direction that is substantially normal thereto;
    means for effecting dispensing of adhesive from said applicator while said applicator is in engagement with said last bottom;
    means for thereafter moving said adhesive applicator to said remote position thereof;
    means enabling said insole to be placed on said last bottom; and
    means for thereafter moving said applicator from its remote position to said pressing position whereby said applicator may press said insole to said last bottom during the bonding therebetween.

4. An apparatus as recited in claim 3 wherein said means mounting said applicator for movement between said remote and said intermediate positions comprises:
    a slide, movable lengthwise of said last when said last is in said predetermined position, said drive means being operatively connected to said slide to effect movement thereof; and
    wherein said means for moving said applicator normal to the bottom of said last into pressing engagement therewith comprises:
    at least one guide bar mounted to said slide for movement in unison therewith,
    means connecting said adhesive applicator to said guide bar for movement along said guide bar, said connecting means being effective to guide said nozzle in a path of movement that is substantially normal to the bottom of said last when said last is in said predetermined position; and
    drive means mounted to said guide bar and operatively connected to said nozzle to effect said movement thereof.

5. An apparatus as recited in claim 4 further comprising:
    means pivotally mounting said guide bar to said slide so as to enable the inclination of said applicator to be adjusted to a position such as to insure that when said applicator is moved to its applying position the discharge orifice thereof may be in flush engagement with the bottom of said last at said predetermined point thereof.

6. A gaging device adapted to align a selected point of a first article with respect to a selected point of a second article and substantially align said selected points of said first and second articles with a third reference point while the first article is above the second article and prior to effecting engagement of the first article with the second article comprising:

a first edge gage for engaging an edge of said first article, said first edge gage being movable in a prone direction that is substantially normal to said edge of said first article;

a second edge gage located below the first edge gage for engaging an edge of said second article, said second edge gage being movable in a prone direction substantially paralleling that of said first edge gage;

means for effecting prone relative movement between said first and second edge gages to a position such that when said first article is in engagement with said first edge gage and when said second article is in engagement with said second edge gage said selected points thereof may be in alignment along a heightwise extending line normal to said paths of movement of said gages; and means for effecting movement of said first and second edge gages in unison in prone directions substantially paralleling the a foresaid prone directions with respect to said third reference point to a position wherein said selected points are in alignment with said third reference point.

7. A gaging device adapted to align a selected point of a first article with a selected point of a second article and subsequently align said aligned selected points of said first and second articles with a third reference point comprising:

a frame;

means for supporting said first and second articles in a predetermined location with respect to said frame;

a first edge gage for engaging an edge of said first article when in said predetermined location, said first edge gage being mounted to said frame for movement in a direction substantially normal to said edge of said first article when in said predetermined position;

a second edge gage for engaging an edge of said second article when in said predetermined location, said second edge gage being mounted to said frame for movement in a direction substantially paralleling that of said first edge gage;

a link; and means connecting said link to said first and second edge gages such that upon movement of said link said edge gages may move in unison along their respective paths of movement, the connection between said link and at least one of said edge gages being so constructed and arranged as to enable said one of said edge gages to be moved along its path of movement with respect to said link and said other edge gage;

whereby the position of at least one of said edge gages may be initially moved to a disposition wherein when said first and second articles are in engagement with their associated edge gages, said selected points of said articles may be in alignment along a line normal to said paths of movement of said gages whereupon said links may be moved to move said gages and articles in unison to a position where said selected points of said articles may be in alignment with said third reference point.

8. An apparatus as recited in claim 7 wherein said connection between said link and said at least one of said edge gages comprises:

a screw located on said link and extending in a direction paralleling the direction of movement of said gages, said screw being threadably engaged with said one of said edge gages so as to enable said movement between said edge gage and said link.

9. A gaging device adapted to align a selected point of a first article with a selected point of a second article and subsequently align said aligned selected points of said first and second articles with a third reference point comprising:

a frame;

a first screw rotatably mounted to said frame;

a first edge gage threadably mounted to said first screw such that rotation of said first screw may effect movement of said edge gage along said first screw; said first edge gage being adapted to engage the edge of said first article;

a second edge gage for engaging an edge of said second article, said edge gage being mounted to said frame for movement in a direction substantially paralleling that of said first edge gage; and a link, secured to said second edge gage and being moveably connected to said first edge gage to enable said link and said second edge gage to be moved with respect to said first edge gage in a direction paralleling that of said first edge gage;

whereby said second edge gage may be moved to a position relative to said first edge gage such that when said gages are in engagement with the edges of their respective articles said selected points of said articles may be in alignment along a line normal to the paths of movement of said edge gages whereupon said first screw may be rotated to effect movement of said gages and said link in unison to a position wherein when said edges of said articles are in engagement with their respective gages said aligned selected points of said articles may be in alignment with said third reference point.

10. An apparatus for engaging a selected portion of a last and aiding in the positioning of an insole on the bottom of said last in registry therewith comprising:

means for supporting said last in a predetermined position;

a gage bar, normally spaced from said last when said last is in said predetermined position;

means mounting said gage bar for movement from said spaced position thereof to a position wherein said gage bar is in engagement with the bulge of said last but in spaced relation with the periphery of the bottom of said last, said gage bar having a portion thereof extending beyond the bottom of said last;

means enabling said insole to be located on the bottom of said last in general registry therewith; and means for thereafter tilting said gage bar such that said end thereof is inclined inwardly to a degree wherein said gage bar is in direct contact with the periphery of the bottom of said last.

11. An apparatus for gripping an end of a last and aiding in the positioning of an insole on the bottom of said last in registry therewith comprising:

means for supporting said last;

at least one gage bar disposed on each side of said end of said last, each of said gage bars being movable from a remote position to a position wherein said gage bars are in engagement with the bulge of each side of said end of said last but in spaced relation with the periphery of the bottom of said last, each of said gage bars having a portion thereof extending beyond the bottom of said last;

means enabling an insole to be located on the bottom of said last in general registry therewith; and means for thereafter effecting tilting of each of said gage bars such that said ends thereof are inclined inwardly to a degree wherein each of said gage bars is in direct contact with the periphery of the bottom of said last.

12. An apparatus for gripping an end of a last and aiding in the positioning of an insole on the bottom of said last in registery therewith comprising:
- a main frame;
- a pair of gage frames supported on said main frame for movement towards and away from each other;
- means for supporting a last bottom-up in a predetermined position such that an end of said last is disposed between said gage frames;
- a gage bar pivotally mounted to each of said gage frames at a pivot point, said pivot points being disposed above the level of the bottom of said last, each of said gage bars extending heightwise of said last and downwardly from said pivot point;
- means biasing each of said gage bars in a normally upright position such that when said gage frames are moved towards each other said gage bars may be brought into engagement with the side of said end of said last in the bulging region of said last, the upper ends of said gage bars being in spaced relation with the periphery of said last bottom;
- drive means for effecting said movement of said gage frames and gage bars into said engagement with said last;
- means enabling said insole to be located on the bottom of said last in general registry therewith; and
- means for thereafter increasing the force with which said drive means urges said gage frames and gage bars towards said last to a degree sufficient to overcome said bias means thus causing said gage bar to tilt inwardly and about said pivot points to a degree wherein each of said gage bars is in direct contact with the periphery of the bottom of said last.

13. An apparatus as recited in claim 12 further comprising:
means for limiting the extent to which said gage bars may tilt inwardly about said pivot points.

14. An apparatus as recited in claim 13 wherein said means for limiting the extent of said tilting of said gage bars comprises:
a stop bolt, threadably mounted to each of said gage frames and extending towards the downwardly extending end of each gage bar so as to be abutted by said gage bar when said gage bars are caused to tilt inwardly.

15. An apparatus as recited in claim 12 further comprising:
a stationary gage bar mounted to each of said gage frames so as to engage the bulge of said last at a point closer to said end of said last, said stationary gage bars being rigidly supported on said gage frames.

16. An apparatus for supporting a last and locking it in position comprising:
- a frame;
- a toe rest mounted to said frame;
- a carriage supported on said frame for movement that is towards and away from said toe rest;
- a last pin pivotally mounted to said carriage and extending upwardly therefrom so as to enable the thimble of said last to be placed on said last pin and the vamp of said last to be placed on said toe rest;
- drive means actuable to effect pivotal movement of said last pin in a direction that is towards said toe rest;
- a first locking member secured to said frame;
- a second locking member mounted to said carriage for movement therewith and for movement against said first locking member to thereby lock said carriage to said frame; and
- means so connecting the second locking member to the drive means as to move the second locking member against the first locking member in response to actuation of the drive means.

17. An apparatus as recited in claim 16 wherein said first locking member comprises a toothed rack extending in a direction paralleling the path of movement of said carriage and wherein said second locking member comprises a toothed member capable of mating cooperation with said rack and wherein said means mounting said toothed member to said carriage comprises:
an arm pivotally mounted to said carriage for pivotal movement towards and away from said rack, said toothed member being secured to said arm so as to be disposed adjacent said rack throughout the range of movement of said carriage.

18. An apparatus as recited in claim 17 further comprising:
a lever securely connected to said last pin and extending downwardly therefrom;
said drive means for effecting said pivotal movement of said last pin comprising a motor having one end thereof connected to said lever; and
wherein said means connecting the second locking member to the drive means comprises means connecting the other end of said motor to said arm in such relation that, when said motor is actuated to pivot said last pin towards said toe rest, the reaction of said other end of said motor may cause said arm to pivot towards said rack thereby causing said toothed member to engage said rack.

References Cited

UNITED STATES PATENTS

| | | | |
|---|---|---|---|
| 1,560,360 | 11/1925 | Topham | 12—127 |
| 2,056,714 | 10/1936 | Cross | 12—127 |
| 3,092,861 | 6/1963 | Reid et al. | 12—142 |
| 3,107,376 | 10/1963 | Reid et al. | 12—1 |
| 3,228,047 | 1/1966 | Schwabe | 12—12.4 |

PATRICK D. LAWSON, Primary Examiner

U.S. Cl. X.R.

12—127